(12) United States Patent
Tang et al.

(10) Patent No.: US 10,749,997 B2
(45) Date of Patent: *Aug. 18, 2020

(54) PREFIX MATCHING BASED PACKET PROCESSING METHOD, SWITCHING APPARATUS, AND CONTROL APPARATUS

(71) Applicant: HUAWEI TECHNOLOGIES CO., LTD., Shenzhen (CN)

(72) Inventors: Pengcheng Tang, Shanghai (CN); Yan Wang, Shanghai (CN); Wei Zhou, Shanghai (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,434

(22) Filed: Jul. 31, 2018

(65) Prior Publication Data

US 2018/0367649 A1 Dec. 20, 2018

Related U.S. Application Data

(63) Continuation of application No. 15/054,265, filed on Feb. 26, 2016, now Pat. No. 10,057,392, which is a
(Continued)

(51) Int. Cl.
*H04L 12/28* (2006.01)
*H04L 29/06* (2006.01)
*H04L 12/721* (2013.01)

(52) U.S. Cl.
CPC ............ *H04L 69/22* (2013.01); *H04L 45/38* (2013.01)

(58) Field of Classification Search
None
See application file for complete search history.

(56) References Cited

U.S. PATENT DOCUMENTS 7,085,281 B2 * 8/2006 Thomas .............. H04J 14/0282
348/E7.07
7,466,703 B1 12/2008 Arunachalam et al.
(Continued)

FOREIGN PATENT DOCUMENTS

CN 101072034 A 11/2007
CN 101272386 A 9/2008
(Continued)

OTHER PUBLICATIONS

OpenFlow Switch Specification Version 1.2 (Wire Protocol 0×03),Dec. 5, 2011. Total 85 pages.
(Continued)

*Primary Examiner* — Gerald A Smarth
(74) *Attorney, Agent, or Firm* — Kilpatrick Townsend & Stockton LLP

(57) ABSTRACT

A packet processing method, device and system includes: receiving, by a switching device, a packet, where there is a correspondence in the switching device between a prefix and a generic flow entry, where the correspondence is created by using the prefix as an index, and a match field of the generic flow entry corresponding to the prefix includes the prefix; acquiring, by the switching device according to the prefix, a bit field that is in the packet and that is used for matching; and performing matching, by the switching device, between a value of the bit field and a data parameter of the match field of the generic flow entry corresponding to the prefix.

17 Claims, 11 Drawing Sheets

Related U.S. Application Data continuation of application No. PCT/CN2013/082430, filed on Aug. 28, 2013.

(56) References Cited

U.S. PATENT DOCUMENTS

| | | | |
|---|---|---|---|
| 7,957,332 B1* | 6/2011 | Chow | H04W 52/0229 370/311 |
| 2001/0012294 A1 | 8/2001 | Kadambi et al. | |
| 2002/0129086 A1* | 9/2002 | Garcia-Luna-Aceves | H04L 45/00 709/200 |
| 2004/0205229 A1 | 10/2004 | Stojancic | |
| 2006/0002836 A1* | 1/2006 | Kim | A61L 9/015 423/210 |
| 2006/0262583 A1* | 11/2006 | Venkatachary | G11C 15/00 365/49.17 |
| 2007/0008888 A1 | 1/2007 | Chawla et al. | |
| 2008/0235792 A1 | 9/2008 | Xing et al. | |
| 2013/0128746 A1 | 5/2013 | Yedavalli | |
| 2013/0163427 A1* | 6/2013 | Beliveau | H04L 67/327 370/235 |
| 2013/0212296 A1* | 8/2013 | Goel | H04L 45/7453 709/238 |
| 2013/0246651 A1 | 9/2013 | Keen et al. | |

FOREIGN PATENT DOCUMENTS

| | | | |
|---|---|---|---|
| CN | 101505279 A | | 8/2009 |
| CN | 102377664 A | | 3/2012 |
| EP | 1 981 238 A1 | | 10/2008 |
| EP | 1981238 A1 | | 10/2008 |
| EP | 2 597 831 A1 | | 5/2013 |
| EP | 2597831 A1 | | 5/2013 |

OTHER PUBLICATIONS

Chinese Office Action for Chinese Application No. 201380001132 dated Oct. 28, 2016.
Extended European Search Report for European Application No. 13892621.7; dated Jul. 11, 2016.
International Search Report dated May 28, 2014, in corresponding International Application No. PCT/CN2013/082430.
Chinese Office Action dated Oct. 28, 2016 in corresponding Chinese Patent Application No. 201380001132.X.
Extended European Search Report dated Jul. 11, 2016 in corresponding European Patent Application No. 13892621.7.
International Search Report dated May 28, 2014 in corresponding International Patent Application No. PCT/CN2013/082430.
Office Action for U.S. Appl. No. 15/054,265 dated Sep. 15, 2017.
Notice of Allowance for U.S. Appl. No. 15/054,265 dated Apr. 20, 2018.

* cited by examiner

PREFIX MATCHING BASED PACKET PROCESSING METHOD, SWITCHING APPARATUS, AND CONTROL APPARATUS

CROSS-REFERENCE TO RELATED APPLICATIONS

This application is a continuation of U.S. patent application Ser. No. 15/054,265, filed on Feb. 26, 2016, which is a continuation of International Application No. PCT/CN2013/082430, filed on Aug. 28, 2013. All of the afore-mentioned patent applications are hereby incorporated by reference in their entireties.

TECHNICAL FIELD

Embodiments relate to communications technologies, and in particular, to a packet processing method, device and system.

BACKGROUND

An OpenFlow (OpenFlow) network includes an OpenFlow switch (OpenFlow Switch) and a control server (Controller). The OpenFlow switch may locally maintain a flow table (Flow Table). If a to-be-forwarded packet has a corresponding entry in the flow table, quick forwarding is directly performed according to the corresponding entry; if there is no corresponding entry in the flow table, the packet is sent to the control server to determine a transmission path, the control server delivers the flow table to the OpenFlow switch after determining the transmission path, and the OpenFlow switch performs forwarding according to the flow table delivered by the control server.

The flow table may include one or more flow entries, and each flow entry is used for packet matching and includes a match field (match field), an instruction set (instructions), and the like. When a field of a received packet matches content in the match field, the OpenFlow switch performs processing according to an action (action) in the instruction set. For example, the OpenFlow switch forwards the packet to a specified output port, drops the packet, modifies a packet header, or forwards the packet to a group table.

Generic flow processing implements atomic processing on a forwarding plane independent of a specific protocol format, the OpenFlow switch can compare a value of any bit field in the received packet with a preset value, and if the value of the bit field is equal to the preset value, the matching succeeds. To designate any bit field in the packet, four parameters, namely, offset (offset), size (size), bit mask (mask), and data (data) are used to describe features of a bit field used for matching. The offset indicates an amount of offset, which is counted from a start position of a packet frame received through an inbound port of the switch; the size indicates a size of consecutive bits following the offset, and the offset and the size jointly designate a continuous bit field of a determined size together in a data packet; and the mask indicates a bit mask within the bit field designated by the offset and the size, and designates bits within the bit field that are involved in a matching operation. A size of the mask is a size of a size byte, the mask is optional, and if the mask is not included, it indicates that a designated entire bit field is used as a bit field used for matching; and the data indicates a value that the bit field used for matching needs to hold. Exemplarily, a process of implementing generic matching is as follows: A generic matching flow entry is added to a flow table of the OpenFlow switch, where the generic matching flow entry includes offset, size, mask, and data. When the OpenFlow switch receives the data packet, if a value of a bit field designated in the packet according to the offset, the size, and the mask is equal to a value of the data, matching succeeds, and then the OpenFlow switch may perform a subsequent operation according to an action (action) designated in the flow entry.

The foregoing offset and size may be referred to as a prefix, and the offset, the size, and the mask may also be referred to as a prefix. That is, a prefix includes the offset and the size, or includes the offset, the size, and the mask.

In practice, processing efficiency of generic matching is relatively low.

SUMMARY

In view of this, embodiments provide a packet processing method, device and system, to resolve the problem that processing efficiency of generic matching is relatively low.

According to a first aspect, a packet processing method is provided, including:
receiving, by a switching device, a packet, where there is a correspondence in the switching device between a prefix and a generic flow entry, where the correspondence is created by using the prefix as an index, and a match field of the generic flow entry corresponding to the prefix includes the prefix;
acquiring, by the switching device according to the prefix, a bit field that is in the packet and that is used for matching; and
performing matching, by the switching device, between a value of the bit field and a data parameter of the match field of the generic flow entry corresponding to the prefix.

With reference to the first aspect, in a first possible implementation manner of the first aspect, there is further an exact flow entry corresponding to the generic flow entry in the switching device, and the method further includes:
performing matching, by the switching device, between the packet and the exact flow entry, to acquire, according to the prefix after the matching succeeds, the bit field that is in the packet and that is used for matching; or
performing matching, by the switching device, between the packet and the exact flow entry after successfully matching the value of the bit field and the data parameter of the match field of the generic flow entry corresponding to the prefix.

With reference to the first aspect or the first possible implementation manner of the first aspect, in a second possible implementation manner of the first aspect, the method further includes:
creating, by the switching device, the correspondence between the prefix and the generic flow entry in the switching device by using the prefix as an index.

With reference to the first aspect or the first or the second possible implementation manner of the first aspect, in a third possible implementation manner of the first aspect, before the creating, by the switching device, the correspondence between the prefix and the generic flow entry in the switching device by using the prefix as an index, the method further includes:
receiving, by the switching device, a prefix configuration message sent by a control device, where the prefix configuration message includes the prefix.

With reference to the first aspect or the third possible implementation manner of the first aspect, in a fourth possible implementation manner of the first aspect, the method further includes:

receiving, by the switching device, a feature request message sent by the control device; and sending, by the switching device, a feature reply message to the control device, where the feature reply message indicates that the switching device supports generic matching, so that the control device sends the prefix configuration message according to the feature reply message.

According to a second aspect, a packet processing method is provided, including:

receiving, by a switching device, a prefix configuration message, where the prefix configuration message includes a prefix; and creating, by the switching device, a correspondence between the prefix and a generic flow entry in the switching device by using the prefix as an index, where a match field of the generic flow entry corresponding to the prefix includes the prefix, so that after receiving a packet, the switching device extracts, according to the prefix, a bit field used for matching, and performs matching between a value of the bit field and a data parameter of the match field of the generic flow entry corresponding to the prefix.

With reference to the second aspect, in a first implementation manner of the second aspect, the method further includes: extracting, by the switching device according to the prefix and after receiving the packet, the bit field used for matching; and performing matching, by the switching device, between the value of the bit field and the data parameter of the match field of the generic flow entry corresponding to the prefix.

With reference to the second aspect or the first implementation manner of the second aspect, in a second implementation manner of the second aspect, the method further includes: receiving, by the switching device, a feature request message sent by a control device, and sending a feature reply message to the control device, where the feature reply message carries a match type supported by the switching device, so that the control device sends the prefix configuration message when determining, according to the match type supported by the switching device, that the switching device supports generic matching.

With reference to the first or the second implementation manner of the second aspect, in a third implementation manner of the second aspect, the switching device further stores an exact flow entry, where the exact flow entry is corresponding to the generic flow entry corresponding to the prefix; and the method further includes: performing matching, by the switching device, between the packet and the exact flow entry, to exact, according to the prefix after the matching succeeds, the bit field used for matching; or performing matching, by the switching device, between the packet and the exact flow entry after successfully matching the value of the bit field and the data parameter of the match field of the generic flow entry corresponding to the prefix.

According to a third aspect, a packet processing method is provided, including:

generating, by a control device, a prefix configuration message, where the prefix configuration message includes a prefix; and sending, by the control device, the prefix configuration message to a switching device, so that the switching device creates a correspondence between the prefix and a generic flow entry in the switching device by using the prefix as an index, where a match field of the generic flow entry corresponding to the prefix includes the prefix.

With reference to the third aspect, in a first possible implementation manner of the third aspect, the method further includes:

when the generic flow entry is delivered to the switching device, collecting, by the control device, statistics on the prefix corresponding to the delivered generic flow entry; and determining, by the control device according to a statistical result, the prefix included in the prefix configuration message.

With reference to the third aspect or the first possible implementation manner of the third aspect, in a second possible implementation manner of the third aspect, the sending, by the control device, the prefix configuration message to a switching device includes:

sending, by the control device, multiple prefix configuration messages to a virtual-layer device, so that the virtual-layer device integrates the multiple prefix configuration messages, and sends a prefix configuration message obtained after integration to the switching device.

With reference to the third aspect or the first or the second possible implementation manner of the third aspect, in a third possible implementation manner of the third aspect, the method further includes:

sending, by the control device, a feature request message to the switching device, and receiving a feature reply message sent by the switching device, where the feature reply message carries a match type supported by the switching device; and determining, by the control device according to the match type supported by the switching device, that the switching device supports generic matching.

According to a fourth aspect, a switching device is provided, including:

a storage unit, configured to store a correspondence that is between a prefix and a generic flow entry and is created by using the prefix as an index, where a match field of the generic flow entry corresponding to the prefix includes the prefix;

a receiving unit, configured to receive a packet;

an acquiring unit, configured to acquire, according to the prefix, a bit field that is in the packet and that is used for matching; and a first matching unit, configured to perform matching between a value of the bit field and a data parameter of the match field of the generic flow entry corresponding to the prefix.

With reference to the fourth aspect, in a first possible implementation manner of the fourth aspect, the storage unit is further configured to store an exact flow entry corresponding to the generic flow entry; and the switching device further includes a second matching unit, where the second matching unit is configured to perform matching between the packet and the exact flow entry, and the first matching unit is specifically configured to: when matching performed by the second matching unit succeeds, perform matching between the value of the bit field and the data parameter of the match field of the generic flow entry corresponding to the prefix.

With reference to the fourth aspect or the first possible implementation manner of the fourth aspect, in a second possible implementation manner of the fourth aspect, the storage unit is further configured to store an exact flow entry corresponding to the generic flow entry; and the switching device further includes a third matching unit, where the third matching unit is configured to perform matching between the packet and the exact flow entry when matching performed by the first matching unit succeeds.

With reference to the fourth aspect or the first or the second possible implementation manner of the fourth aspect, in a third possible implementation manner of the fourth aspect, the switching device further includes a creating unit, where the creating unit is configured to create the correspondence between the prefix and the generic flow entry by using the prefix as an index.

With reference to the fourth aspect, or the first, the second, or the third implementation manner of the fourth aspect, in a fourth implementation manner of the fourth aspect, the receiving unit is further configured to receive a prefix configuration message sent by a control device, where the prefix configuration message includes the prefix.

With reference to the fourth aspect or the first, the second, the third, or the fourth implementation manner of the fourth aspect, in a fifth implementation manner of the fourth aspect, the receiving unit is further configured to receive a feature request message sent by the control device; and the switching device further includes a sending unit, configured to send a feature reply message to the control device, where the feature reply message indicates that the switching device supports generic matching, so that the control device sends the prefix configuration message according to the feature reply message.

According to a fifth aspect, a switching device is provided, including: a memory, a processor, and a communication unit; where
the memory is configured to store a correspondence that is between a prefix and a generic flow entry and is created by using the prefix as an index, where a match field of the generic flow entry corresponding to the prefix includes the prefix;
the communication unit is configured to receive a packet; and
the processor is configured to: acquire, according to the prefix, a bit field that is in the packet and that is used for matching, and perform matching between a value of the bit field and a data parameter of the match field of the generic flow entry corresponding to the prefix.

With reference to the fifth aspect, in a first implementation manner of the fifth aspect, the memory is further configured to store an exact flow entry corresponding to the generic flow entry; and that the processor is configured to perform matching between a value of the bit field and a data parameter of the match field of the generic flow entry corresponding to the prefix includes: the processor is configured to: perform matching between the packet and the exact packet, and after the matching succeeds, perform matching between the value of the bit field and the data parameter of the match field of the generic flow entry corresponding to the prefix.

With reference to the fifth aspect, in a second implementation manner of the fifth aspect, the memory is further configured to store an exact flow entry corresponding to the generic flow entry; and the processor is further configured to perform matching between the packet and the exact flow entry when matching performed between the value of the bit field and the data parameter of the match field of the generic flow entry corresponding to the prefix succeeds.

With reference to the fifth aspect or the first or the second implementation manner of the fifth aspect, in a third implementation manner of the fifth aspect, the processor is further configured to create the correspondence between the prefix and the generic flow entry by using the prefix as an index.

With reference to the fifth aspect, or the first, the second, or the third implementation manner of the fifth aspect, in a fourth implementation manner of the fifth aspect, the communication unit is further configured to receive a prefix configuration message sent by a control device, where the prefix configuration message includes the prefix.

With reference to the fourth implementation manner of the fifth aspect, in a fifth implementation manner of the fifth aspect, the communication unit is further configured to: receive a feature request message sent by the control device, and send a feature reply message to the control device, where the feature reply message indicates that the switching device supports generic matching, so that the control device sends the prefix configuration message according to the feature reply message.

According to a sixth aspect, a switching device is provided, including:
a receiving unit, configured to receive a prefix configuration message, where the prefix configuration message includes a prefix; and
a creating unit, configured to create a correspondence between the prefix and a generic flow entry in the switching device by using the prefix as an index, where a match field of the generic flow entry corresponding to the prefix includes the prefix, so that after receiving a packet, the switching device extracts, according to the prefix, a bit field used for matching, and performs matching between a value of the bit field and a data parameter of the match field of the generic flow entry corresponding to the prefix.

With reference to the sixth aspect, in a first implementation manner of the sixth aspect, the receiving unit is further configured to receive the packet; and
the switching device further includes:
an extracting unit, configured to extract, from the packet according to the prefix, the bit field used for matching; and
a matching unit, configured to perform matching between the value of the bit field and the data parameter of the match field of the generic flow entry corresponding to the prefix.

With reference to the sixth aspect or the first implementation manner of the sixth aspect, in a second implementation manner of the sixth aspect, the receiving unit is further configured to receive a feature request message sent by a control device, and the switching device further includes a sending unit, configured to send a feature reply message to the control device, where the feature reply message carries a match type supported by the switching device, so that the control device sends the prefix configuration message when determining, according to the match type supported by the switching device, that the switching device supports generic matching.

With reference to the first or the second implementation manner of the sixth aspect, in a third implementation manner of the sixth aspect, the switching device further stores an exact flow entry, where the exact flow entry is corresponding to the generic flow entry corresponding to the prefix; and the matching unit is further configured to perform matching between the packet and the exact flow entry, to exact, according to the prefix after the matching succeeds, the bit field used for matching; or the matching unit is further configured to perform matching between the packet and the exact flow entry after successfully matching the value of the bit field and the data parameter of the match field of the generic flow entry corresponding to the prefix.

According to a seventh aspect, a switching device is provided, including: a communication unit, a memory, and a processor; where the communication unit is configured to receive a prefix configuration message, where the prefix configuration message includes a prefix;

the processor is configured to create a correspondence between the prefix and a generic flow entry in the switching device by using the prefix as an index, where a match field of the generic flow entry corresponding to the prefix includes the prefix, so that after receiving a packet, the switching device extracts, according to the prefix, a bit field used for matching, and performs matching between a value of the bit field and a data parameter of the match field of the generic flow entry corresponding to the prefix; and the memory is configured to store the prefix, the generic flow entry, and the correspondence between the prefix and the generic flow entry.

With reference to the seventh aspect, in a first implementation manner of the seventh aspect, the communication unit is further configured to receive the packet; and the processor is further configured to: extract, from the packet according to the prefix, the bit field used for matching, and perform matching between the value of the bit field and the data parameter of the match field of the generic flow entry corresponding to the prefix.

With reference to the seventh aspect or the first implementation manner of the seventh aspect, in a second implementation manner of the seventh aspect, the communication unit is further configured to: receive a feature request message sent by a control device, and send a feature reply message to the control device, where the feature reply message carries a match type supported by the switching device, so that the control device sends the prefix configuration message when determining, according to the match type supported by the switching device, that the switching device supports generic matching.

With reference to the first or the second implementation manner of the seventh aspect, in a third implementation manner of the seventh aspect, the memory is further configured to store an exact flow entry, where the exact flow entry is corresponding to the generic flow entry corresponding to the prefix; and the processor is further configured to perform matching between the packet and the exact flow entry, to exact, according to the prefix after the matching succeeds, the bit field used for matching; or the processor is further configured to perform matching between the packet and the exact flow entry after successfully matching the value of the bit field and the data parameter of the match field of the generic flow entry corresponding to the prefix.

According to an eighth aspect, a control device is provided, including:

a generating unit, configured to generate a prefix configuration message, where the prefix configuration message includes a prefix; and a sending unit, configured to send the prefix configuration message to a switching device, so that the switching device creates a correspondence between the prefix and a generic flow entry in the switching device by using the prefix as an index, where a match field of the generic flow entry corresponding to the prefix includes the prefix.

With reference to the eighth aspect, in a first possible implementation manner of the eighth aspect, the control device further includes:

a statistics collecting unit, configured to: when the generic flow entry is delivered to the switching device, collect statistics on the prefix corresponding to the delivered generic flow entry; and a determining unit, configured to determine, according to a statistical result, the prefix included in the prefix configuration message.

With reference to the eighth aspect or the first possible implementation manner of the eighth aspect, in a second possible implementation manner of the eighth aspect, the sending unit is specifically configured to send multiple prefix configuration messages to a virtual-layer device, so that the virtual-layer device integrates the multiple prefix configuration messages, and sends a prefix configuration message obtained after integration to the switching device.

With reference to the eighth aspect, or the first or the second possible implementation manner of the eighth aspect, in a third possible implementation manner of the eighth aspect, the sending unit is further configured to send a feature request message to the switching device; and the control device further includes a receiving unit and a capability determining unit, where the receiving unit is configured to receive a feature reply message sent by the switching device, where the feature reply message carries a match type supported by the switching device, and the capability determining unit is configured to determine, according to the match type supported by the switching device, that the switching device supports generic matching.

According to a ninth aspect, a control device is provided, including: a communication unit and a processor; where the processor is configured to generate a prefix configuration message, where the prefix configuration message includes a prefix; and the communication unit is configured to send the prefix configuration message to a switching device, so that the switching device creates a correspondence between the prefix and a generic flow entry in the switching device by using the prefix as an index, where a match field of the generic flow entry corresponding to the prefix includes the prefix.

With reference to the ninth aspect, in a first possible implementation manner of the ninth aspect, the processor is further configured to: when the generic flow entry is delivered to the switching device, collect statistics on the prefix corresponding to the delivered generic flow entry; and determine, according to a statistical result, the prefix included in the prefix configuration message.

With reference to the ninth aspect or the first possible implementation manner of the ninth aspect, in a second possible implementation manner of the ninth aspect, the communication unit is specifically configured to send multiple prefix configuration messages to a virtual-layer device, so that the virtual-layer device integrates the multiple prefix configuration messages, and sends a prefix configuration message obtained after integration to the switching device.

With reference to the ninth aspect, or the first or the second possible implementation manner of the ninth aspect, in a third possible implementation manner of the ninth aspect, the communication unit is further configured to: send a feature request message to the switching device, and receive a feature reply message sent by the switching device, where the feature reply message carries a match type supported by the switching device; and the processor is further configured to determine, according to the match type supported by the switching device, that the switching device supports generic matching.

According to a tenth aspect, a packet processing system is provided, including any one of the foregoing switching devices and any one of the foregoing control devices.

According to the foregoing technical solutions, in the embodiments, a switching device acquires a prefix, and after receiving a packet, the switching device first extracts, according to the prefix, a bit field used for matching, and then performs matching between the bit field used for matching and a generic flow entry in a generic flow table. In this way, preprocessing on the packet is implemented, and extracting and matching do not need to be performed, according to every generic flow entry in the generic flow table, on the bit field that is of the packet and that is used for matching, which can reduce a quantity of times of extracting the bit field used for matching from the packet, and improve processing efficiency of generic matching.

BRIEF DESCRIPTION OF DRAWINGS

To describe the technical solutions in the embodiments more clearly, the following briefly introduces the accompanying drawings required for describing the embodiments. Apparently, the accompanying drawings in the following description show some embodiments, and persons of ordinary skill in the art may still derive other drawings from these accompanying drawings without creative efforts.

DESCRIPTION OF EMBODIMENTS

To make the objectives, technical solutions, and advantages of the embodiments clearer, the following clearly describes the technical solutions in the embodiments with reference to the accompanying drawings in the embodiments.

Apparently, the described embodiments are some but not all of the embodiments. All other embodiments obtained by persons of ordinary skill in the art based on the embodiments without creative efforts shall fall within the protection scope of the present invention.

Figure 1:
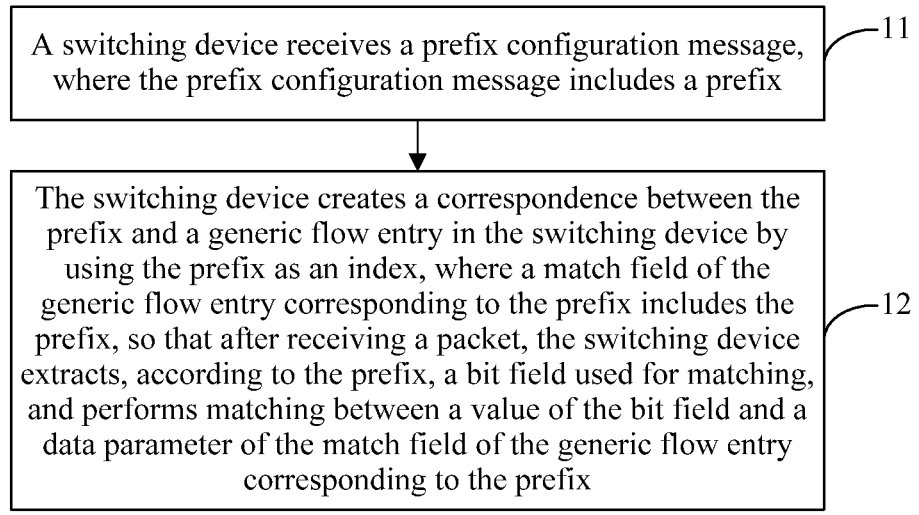
FIG. 1 is a schematic flowchart of a packet processing method according to an embodiment.

FIG. 1 is a schematic flowchart of a packet processing method according to an embodiment, and the method includes the following steps:

11. A switching device receives a prefix configuration message, where the prefix configuration message includes a prefix.

Exemplarily, a quantity of prefixes included in the prefix configuration message may be one or more, and a specific quantity may be preset.

Exemplarily, in the prefix configuration message, it is assumed that content of the prefix is as follows: offset=5, size=8, and mask=11111111, or content of the prefix is as follows: offset=5 and size=8, where the foregoing two prefixes indicate that all bits in a bit field ranging from the sixth bit starting from a start position, to the thirteenth bit of a packet are involved in a matching operation. For another example, there is a field A[0-15] of a packet, which indicates that the field of the packet has totally 16 bits, and the bits are numbered from 0 to 15 in ascending order, where A[0] indicates the first bit in the bits, A[1] indicates the second bit in the bits, and so on. When the prefix is offset=5, size=8, and mask=11111111 or when the prefix is offset=5 and size=8, it indicates that all bits in a bit field A[5-12] in the A[0-15] are used for matching. For another example, when mask=10100000, it indicates that the first bit and the third bit, A[5] and A[7], in A[5-12] are used for matching.

Exemplarily, the prefix configuration message may be used to add, modify, or delete a prefix configuration table, where when a control device delivers multiple prefixes to the switching device, the switching device may store the multiple prefixes in a list form, and the list may be referred to as the prefix configuration table.

12. The switching device creates a correspondence between the prefix and a generic flow entry in the switching device by using the prefix as an index, where a match field of the generic flow entry corresponding to the prefix includes the prefix, so that after receiving a packet, the switching device extracts, according to the prefix, a bit field used for matching, and performs matching between a value of the bit field and a data parameter of the match field of the generic flow entry corresponding to the prefix.

The prefix included in the prefix configuration message and the prefix included in the match field of the generic flow entry may differ in data structure, but carry same content.

Exemplarily, the created correspondence between the prefix and the generic flow entry may also be stored in the prefix configuration table, or may independently exist in another list, which is not limited in this embodiment.

Exemplarily, it is assumed that there are generic flow entries T1, T2, T3, and T4 in the switching device, if T1, T2, and T3 all include a prefix X, and when the prefix configuration message received by the switching device includes the prefix X, the switching device may create correspondences between the prefix X and T1, T2, and T3, that is, there is a correspondence between the prefix X and each of T1, T2, and T3. When the switching device receives a packet, for example, A[0-15], the switching device may first acquire a to-be-matched field, that is, a bit field used for matching, for example, A[2-9], of the packet by using the prefix X and by using the created correspondences, and then separately perform matching, according to the created correspondences between the prefix X and T1, T2, and T3, between a value of the bit field A[2-9] used for matching and data parameters of match fields in T1, T2, and T3. In this way, in processes of performing matching with T1, T2, and T3, the bit field A[2-9] used for matching needs to be acquired only once. However, in practice, because the correspondence between the prefix and the generic flow entry in the switching device is not created, it cannot be further learnt that the bit field A[2-9] used for matching can be used for matching with T1, T2, and T3. After the switching device receives the packet A, in each of separate processes of performing matching with T1, T2, and T3, the bit field A[2-9] used for matching needs to be acquired once, that is, the bit field A[2-9] used for matching is totally acquired for three times, which causes repeated acquiring operations. Therefore, by creating the correspondence between the prefix and the generic flow entry in the switching device, the acquired bit field used for matching may be used to perform matching with multiple generic flow entries in a matching process, and an operation of acquiring the bit field used for matching does not need to be performed once for each generic flow entry, thereby improving efficiency of processing the generic flow entry.

To describe the solution in this embodiment more clearly, in this embodiment, a process of performing matching on a flow entry by creating a correspondence between a prefix and a generic flow entry, as proposed in this embodiment, is referred to as an optimized processing process of generic matching; accordingly, a process of directly performing matching between a packet and a generic flow entry without the correspondence between the prefix and the generic flow entry created as proposed in this embodiment, is referred to as a common processing process of generic matching.

After the correspondence between the prefix and the generic flow entry is created in the switching device, and after receiving the packet, the switching device may perform the optimized processing process of generic matching.

Exemplarily, the optimized processing process of generic matching may include:
  extracting, by the switching device according to the prefix and after receiving the packet, the bit field used for matching; and
  performing matching, by the switching device, between the value of the bit field and the data parameter of the match field of the generic flow entry corresponding to the prefix.

In an optional implementation manner, after steps 11 and 12, the method shown in FIG. 1 may further include the optimized processing process of generic matching.

Persons skilled in the art should know that, when the switching device already stores the correspondence between the prefix and the generic flow entry (for example, in a manner shown in FIG. 1, the switching device creates the correspondence between the prefix and the generic flow entry, or the switching device may acquire the correspondence from another switching device in which the correspondence between the prefix and the generic flow entry is already created), and after subsequently receiving the packet, the switching device may directly perform the optimized processing process of generic matching, and does not need to execute steps 11 and 12.

In an optional implementation manner, the method shown in FIG. 1 may further include:
  receiving, by the switching device, a feature request message sent by the control device, and sending a feature reply message to the control device, where the feature reply message carries a match type supported by the switching device, so that the control device sends the prefix configuration message when determining, according to the match type supported by the switching device, that the switching device supports generic matching.

Exemplarily, before sending the prefix configuration message to the switching device, the control device may first learn whether the switching device has a capability of processing generic matching, where the capability of processing generic matching may be understood as a capability of processing a generic flow entry, or may be understood as a capability of processing a prefix. Generally, a request message may be used to request the switching device to report whether the switching device has the capability of generic matching, and a specific implementation manner of this type of request message is not limited in this embodiment.

In an optional implementation manner, the switching device may further store an exact flow entry, that is, the switching device stores both the exact flow entry and the generic flow entry, where there may also be a correspondence between the exact flow entry and the generic flow entry. For example, there is an exact flow entry T1 and a generic flow entry T2, and there is a correspondence between T1 and T2; in this case, the correspondence between T1 and T2 may be described as follows: Matching is first performed on T1, and only after the matching succeeds, matching is then performed on T2; or the correspondence between T1 and T2 may be described as follows: Matching is first performed on T2, and after the matching succeeds, matching is then performed on T1. In view of this, the method shown in FIG. 1 may further include: performing matching, by the switching device, between the packet and the exact flow entry, to exact, according to the prefix after the matching succeeds, the bit field used for matching; or the method may further include: performing matching, by the switching device, between the packet and the exact flow entry after successfully matching the value of the bit field and the data parameter of the match field of the generic flow entry corresponding to the prefix.

Persons skilled in the art should know that explanations and examples about concepts and content such as the prefix, the prefix configuration message, the prefix configuration table, the correspondence between the prefix and the generic flow entry, and the capability of generic matching in the embodiment related to FIG. 1 are also applicable to other embodiments.

Exemplarily, the control device in this embodiment may be a control server (Controller) in an OpenFlow network, and the switching device may be an OpenFlow switch (OpenFlow Switch) in the OpenFlow network.

Exemplarily, the prefix configuration message may be sent by the control device to the switching device, or may be sent by another device to the switching device.

Figure 2:
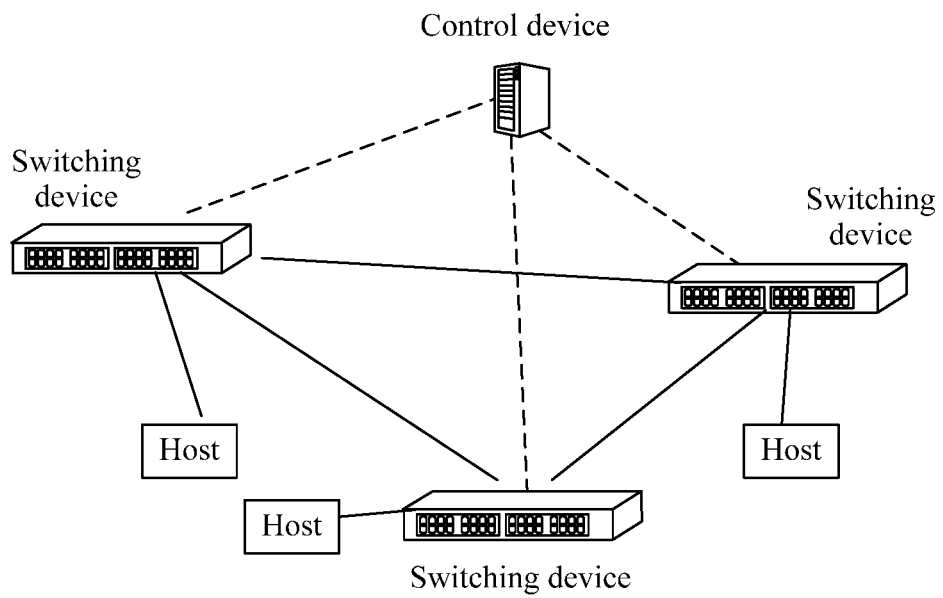
FIG. 2 is a schematic structural diagram of an OpenFlow network according to an embodiment.

As shown in FIG. 2, FIG. 2 shows an OpenFlow network, where the network includes a control device, a switching device, and a host, and the method shown in FIG. 1 may be applied to the network shown in FIG. 2. In FIG. 2, the control device delivers a prefix configuration message to the switching device. The network shown in FIG. 2 is used as an example in the following to describe the packet processing method provided in this embodiment.

Figure 3:
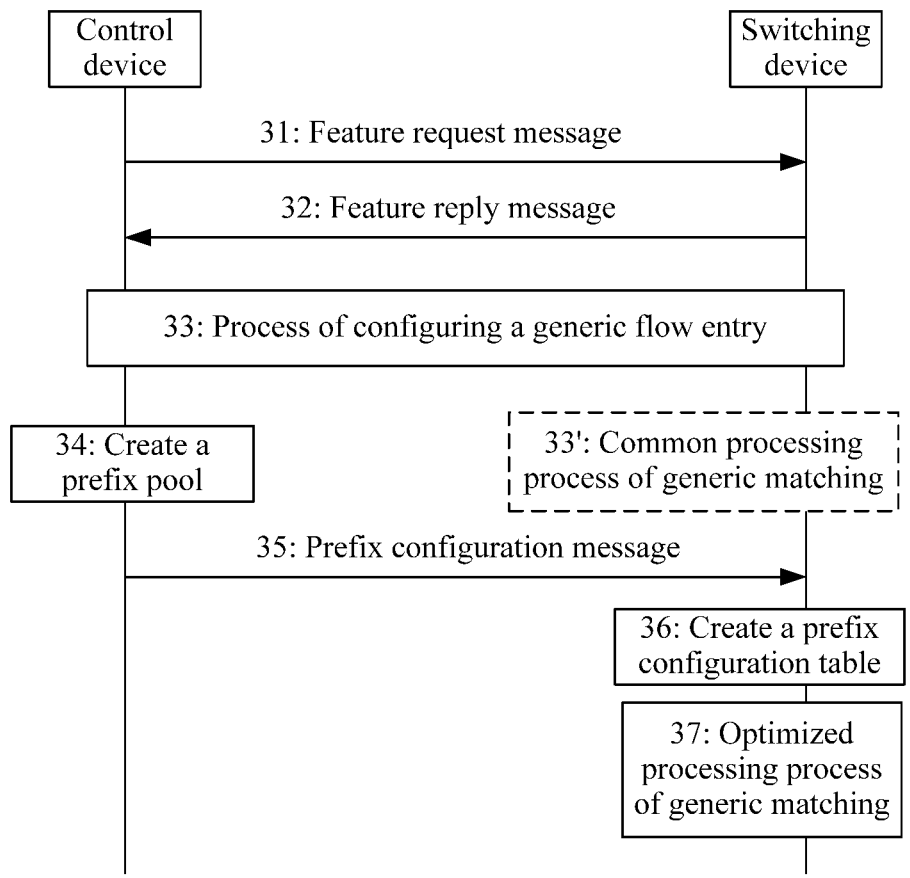
FIG. 3 is a schematic flowchart of another packet processing method according to an embodiment.

In a scenario shown in FIG. 3, a control device learns in advance whether a switching device can support generic matching, and when the control device determines that the switching device can support generic matching, the control device forms, according to related generic flow entries in a process of configuring generic flow entries for the switching device, a prefix pool by using prefixes corresponding to the related generic flow entries, and sends, to the switching device by using a prefix configuration message, prefixes that are in the prefix pool and that are corresponding to more generic flow entries, so that the switching device can create a prefix configuration table according to the delivered prefixes, and store a created correspondence between prefixes and generic flow entries in the prefix configuration table, and after receiving a packet, the switching device may perform, according to the correspondence between prefixes and generic flow entries, an optimized processing process of generic matching. The following describes in detail the scenario shown in FIG. 3.

Referring to FIG. 3, steps 31 and 32 are a process in which the control device learns whether the switching device can support generic matching. This process is not a required process, and a specific network status may be considered for determining whether this process it to be performed. For example, if all switching devices connected to the control device in FIG. 2 support generic matching, it is not necessary to perform this process, and if configuration information in the control device in FIG. 2 already indicates that some switching devices connected to the control device support generic matching, the control device may perform this process with another switching device that does not indicate whether generic matching is supported. This process may include the following steps:

31. The control device sends a feature request (feature request) message to the switching device.

A purpose of sending the feature request message to the switching device by the control device is to learn whether the switching device supports generic matching. Persons skilled in the art should know that a message of another form, for example, a generic matching capability query message, may also be used to learn whether the switching device supports generic matching, which is not limited herein.

32. The switching device sends a feature reply (feature reply) message to the control device, to indicate whether generic matching is supported.

The switching device may directly return, to the control device, whether generic matching is supported, or may return a supported match type to the control device, so that the control device learns whether the switching device supports generic matching.

Exemplarily, the match type supported by the switching device may include exact matching and/or generic matching. Exact matching means that the switching device may process a packet according to an exact flow entry, and generic matching means that the switching device may perform processing according to a generic flow entry.

For example, the switching device replies, by using the feature reply message, whether the switching device supports generic matching and/or exact matching.

In an example of this embodiment, the switching device supports generic matching.

Generally, one flow table includes one or more flow entries, each flow entry includes a match field (match field) and an instruction set (instructions), and when a field of the packet matches the match field, the switching device processes the packet according to an action (action) in the instruction set.

According to an optional opinion, a difference between the exact flow entry and the generic flow entry lies in that a match field in the exact flow table includes a specific field name, such as a source IP address, a destination IP address, and a port number; a match field in the generic flow table does not include a specific field name, but offset and size are used to indicate a position of a to-be-matched field in the packet, and mask and data are used to indicate a to-be-matched value. For example, it indicates that the to-be-matched field is a field ranging from the $M^{th}$ byte starting from a start position of a packet frame, to the $N^{th}$ byte. Because specific field names in a current exact flow table are only fields at Layer 2 to Layer 4 (L2 to L4), there are some limitations. However, the generic flow table uses the offset, size, and mask form, which are not limited to L2 to L4, and may indicate fields from Layer 2 to Layer 7 (L7), that is, fields that may be indicated by the generic flow table include the fields from L2 to L7.

33. Before the switching device creates a prefix configuration table, a process of configuring a generic flow entry may be performed between the control device and the switching device.

In an optional implementation manner, after the switching device is configured with the generic flow entry, the switching device may perform a common processing process of generic matching, as shown in step 33'.

Exemplarily, the process of configuring the generic flow entry may also be understood as a process in which the switching device acquires the generic flow entry from the control device.

Figure 4:
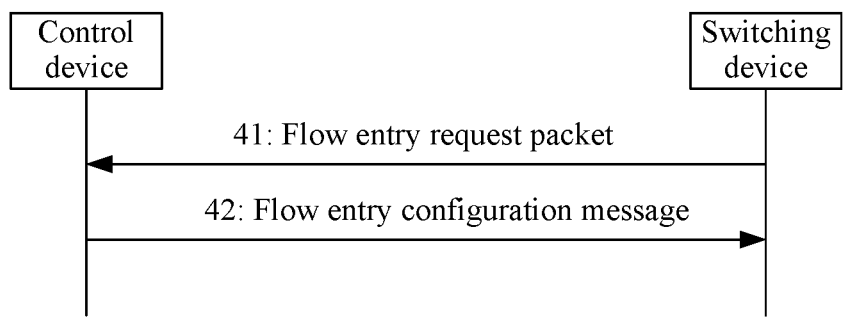
FIG. 4 is a schematic flowchart of acquiring a generic flow table according to an embodiment.

Exemplarily, for the process of configuring the generic flow entry, reference may be made to FIG. 4 and the process includes the following steps:

41. After the switching device receives a packet, if the switching device does not store a generic flow entry that matches the packet, the switching device sends a flow entry request packet (packet_in) to the control device, where the flow entry request packet is encapsulated with the received packet.

42. After receiving the flow entry request packet sent by the switching device, the control device determines that the flow entry request packet is encapsulated with the generic flow entry corresponding to the packet received by the switching device, and sends a flow entry configuration (flow_mod) message to the switching device, where the flow entry configuration message includes the generic flow entry.

In an optional implementation manner, the switching device may save the received generic flow entry in a list, and the list may be referred to as a generic flow table.

Now the switching device has acquired the generic flow entry corresponding to the packet, and may perform corresponding processing on the packet according to the acquired generic flow entry, that is, may perform the common processing process of generic matching on the packet.

Figure 5:
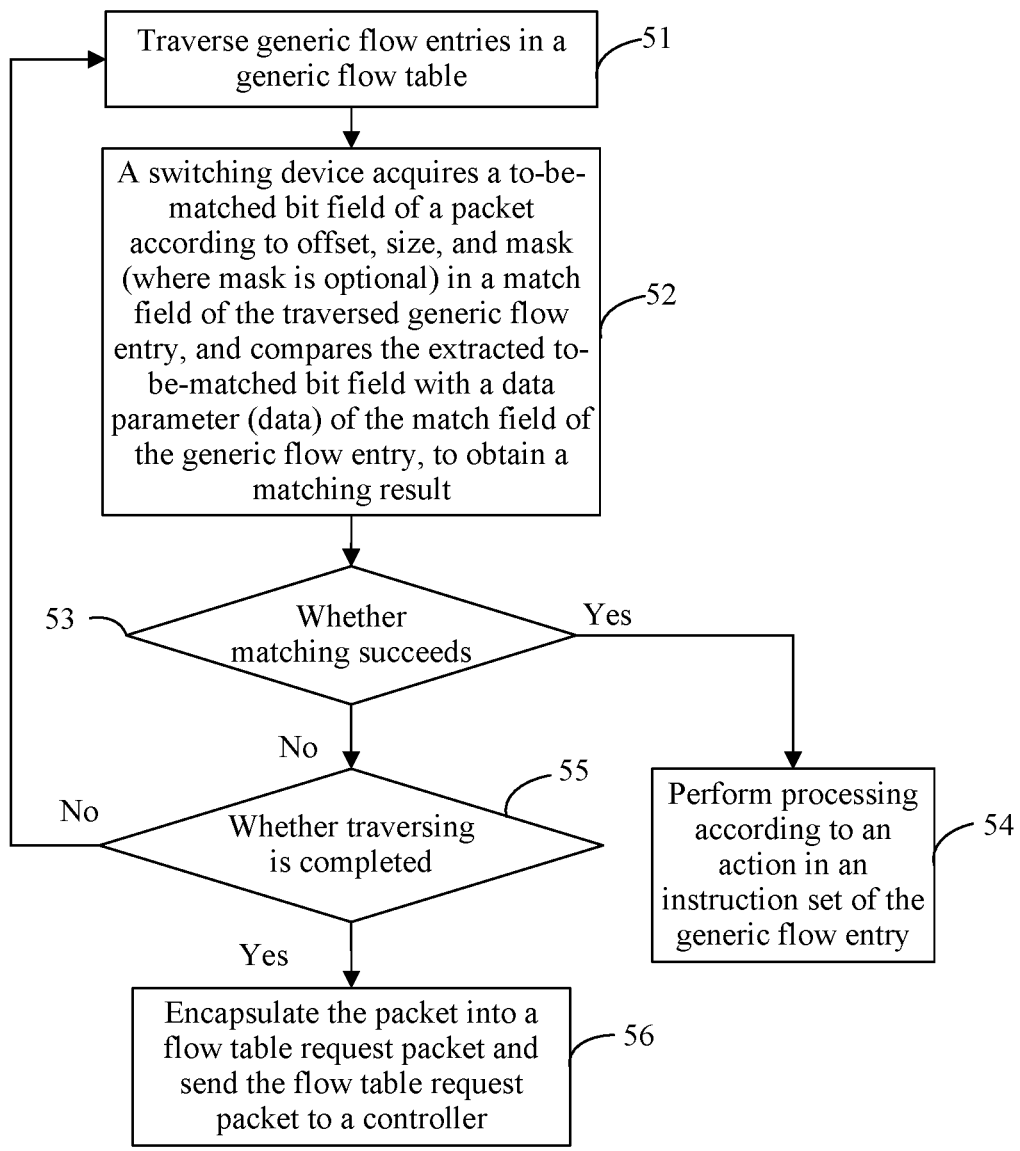
FIG. 5 is a schematic diagram of an unoptimized procedure of packet processing according to a generic flow table.

Exemplarily, for the common processing process of generic matching, reference may be made to FIG. 5 and the process includes the following steps:

When the switching device receives the packet, the following steps are executed:

51. The switching device traverses generic flow entries in a generic flow table.

52. The switching device acquires a to-be-matched bit field of the packet according to an offset, a size, and a mask (where the mask is optional) in a match field of the traversed generic flow entry, and compares the extracted to-be-matched bit field with a data parameter (data) of the match field of the generic flow entry, to obtain a matching result.

Each generic flow entry may include a match field (match field) and an instruction set (instructions), where the match field may record a prefix (that is, offset, size and mask, where mask is optional) and a value (which may also be understood as a data parameter, that is, data) corresponding to the prefix, and the instruction set may record an action (action). When a value of the to-be-matched bit field in the packet acquired according to the prefix matches a value (data) of the match field of the generic flow entry, the action in the corresponding instruction set may be performed on the packet.

For example, if a prefix of the currently traversed generic flow entry is a first prefix, where the first prefix specifically includes offset 1, size 1, and mask 1, and a value corresponding to the first prefix is data 1, the switching device extracts, according to offset 1 and size 1, a corresponding first generic field from the received packet, where the generic field may also be referred to as a bit field used for matching, and the switching device masks the extracted first generic field by using mask 1, and compares a masked first generic field with data 1, and if the two are the same, the matching succeeds, and if the two are different, the matching fails. For example, an eight-bit field such as 00101101 is extracted by using offset 1 and size 1, and to extract four middle bits, an OR operation or an AND operation may be used during masking. In the OR operation, it is set that mask 1=11000011, and in the AND operation, it is set that mask 1=00111100. If 11101111 is obtained after masking is performed, because data 1 is 11101111, the matching succeeds. Certainly, it may be understood that when matching is being performed by using offset, size, mask, and data, it is not limited to the foregoing matching type. For example, hash searching may also be performed. The foregoing manner is merely an example, and another defined matching type may alternatively be used.

53. The switching device determines whether the matching succeeds, if the matching succeeds, executes step 54, and if the matching fails, executes step 55.

54. The switching device performs processing according to an action in an instruction set of the generic flow entry, and then the process ends.

In an optional implementation manner, after the matching succeeds, the switching device may first record the action in the instruction set of the matched generic flow entry, and then traverse another generic flow entry, and if there is another flow entry that also matches the received packet, the switching device records an action of an instruction set of the another flow entry together, and then executes the recorded actions after all flow entries in the flow table are traversed.

55. The switching device determines whether the traverse is completed, and if there is no matched generic flow entry, step 56 may be executed, and if there is a matched generic flow entry, step 52 and subsequent steps are repeatedly executed.

56. The switching device encapsulates the packet into a flow table request packet (packet_in) and sends the flow table request packet to the control device, to request the control device to deliver a flow entry that matches the received packet, and then the process ends, where step 56 is not an indispensable step in the common processing process of generic matching.

It may be seen from the procedure shown in FIG. 5 that, in the common processing process of generic matching, flow entries in a generic flow table need to be traversed, and therefore, a to-be-matched bit field of a packet needs to be extracted for each of the traversed generic flow entries. However, these generic flow entries may have a same prefix. For example, 100 generic flow entries are traversed in the foregoing traversing process, and it is likely that prefixes (offset, size, and mask, where mask is optional) of 20 generic flow entries are the same; in this case, when matching is performed on the 20 generic flow entries, the to-be-matched bit field actually needs to be extracted from the packet only once, and matching is then separately performed between the to-be-matched bit field and data parameters of match fields of the 20 generic flow entries. However, in the common processing process of generic matching, the to-be-matched bit field needs to be extracted once in a process of performing matching on each generic flow entry, and therefore, the to-be-matched bit field needs to be extracted repeatedly from the packet for 20 times, which may cause low efficiency. To improve the efficiency, in this embodiment, a prefix configuration table may be created in the switching device, and generic flow entries that have a same prefix are classified into one type. During matching, a to-be-matched bit field needs to be extracted only once for each type of generic flow entry, and matching is then performed between the to-be-matched bit field and a data parameter of a match field of each generic flow entry of this type; in this way, a quantity of extracting times can be reduced. For example, in the foregoing scenario, in this embodiment, the prefix configuration table is created, the 20 generic flow entries that have the same prefix are classified into one type, and the to-be-matched field of the packet may be extracted only once, and does not need to be extracted for 20 times. Exemplarily, the following procedure may be used to create the prefix configuration table in the switching device.

34. The control device creates a prefix pool (prefix pool).

Each time the control device delivers a flow table configuration message, statistics may be collected on statuses of prefixes of generic flow entries carried in the flow table configuration message, the prefixes are arranged based on priority, quantity of times, or the like, to create the prefix pool. For example, according to statistics, within a first time, five generic flow entries that include a first prefix are sent, three generic flow entries that include a second prefix are sent, and one generic flow entry that includes a third prefix is sent; in this case, the created prefix pool includes the first prefix, the second prefix, and the third prefix, and a front-to-back sequence is the first prefix, the second prefix, and the third prefix.

Step 34 is optional, and the prefix delivered to the switching device may also be implemented in a configuration manner or in a manner of negotiating with another device, which is not limited herein. By collecting statistics on usage statuses of the prefixes and delivering the prefixes to the switching device according to the usage statuses, the switching device can create a more proper and more scientific prefix configuration table, to further improve processing efficiency of the switching device.

35. The control device sends a prefix modification (generic prefix modification) message to the switching device, where the prefix modification message carries a prefix selected from the prefix pool.

Exemplarily, a quantity of carried prefixes may be preset. For example, the quantity is set to 2, and in the foregoing scenario, prefixes carried in the prefix configuration message are the first prefix and the second prefix.

The prefix configuration message may be specifically used to add, modify, or delete the prefix configuration table.

A structure of the prefix configuration message may be shown in Table 1:

TABLE 1

| struct ofp header | header |
|---|---|
| uint8 t | prefix table id |
| uint8 t | command |
| struct prefix | prefix[ ] |

That is, the prefix configuration message may include the following fields: a header, a prefix table id, a command, and a prefix[ ], where the header is an OpenFlow message header; the prefix table id is a sequence number of the prefix configuration table; the command is a command type, such as adding, modifying, or deleting; and the prefix[ ] is a prefix, for example, the foregoing first prefix and second prefix, and a quantity of prefixes is variable.

36. The switching device creates the prefix configuration table according to the prefix configuration message.

The prefix configuration table may also be referred to as a set or another name.

For example, if the prefix table id included in the prefix configuration message is id1, the prefix[ ] includes the first prefix and the second prefix, and the command is add, the switching device may create a prefix configuration table whose identity is id 1, and prefixes included in the prefix configuration table are the first prefix and the second prefix. Certainly, it may be understood that if the prefix configuration table whose identity is id 1 has already been created in the switching device, the switching device may add the first prefix and the second prefix to the existing prefix configuration table.

37. After the switching device creates the prefix configuration table, an optimized processing process of generic matching may be used between the control device and the switching device to process the packet.

Figure 6:
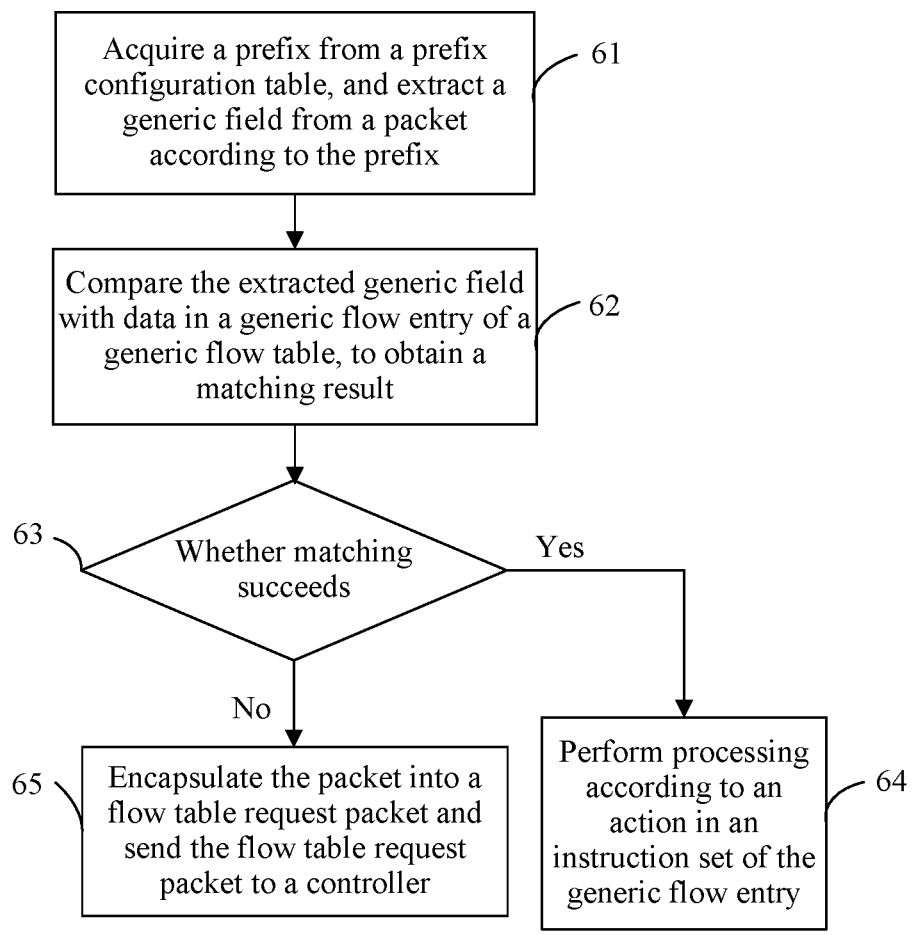
FIG. 6 is a schematic flowchart of packet processing according to a generic flow table according to an embodiment.

Exemplarily, referring to FIG. 6, the optimized processing process of generic matching may include the following steps:

After the switching device receives the packet, the following steps are executed:

61. The switching device acquires a prefix from the prefix configuration table, and extracts a to-be-matched bit field from the packet according to the prefix.

62. The switching device compares the extracted to-be-matched bit field with a data parameter of a match field of a generic flow entry corresponding to the foregoing prefix, to obtain a matching result.

Generally, there may be identical prefixes in the generic flow entry, but the created prefix configuration table includes different prefixes.

For example, if the generic flow entry includes 100 prefixes, but may have only 20 different prefixes, the created prefix configuration table may include the 20 different prefixes. Therefore, when the to-be-matched bit field is being extracted, the to-be-matched bit field needs to be extracted for 100 times in the common processing process of generic matching, but in this embodiment, only 20 times of extraction are needed, which can improve searching efficiency.

63. The switching device determines whether matching succeeds, if the matching succeeds, executes step 64, and if the matching fails, executes step 65.

During the matching, the corresponding generic flow entry may be acquired by using the prefix as an index. For example, a first to-be-matched bit field is extracted from the received packet according to a first prefix in the prefix configuration table, and a match field of a first generic flow entry includes the first prefix, and then a value of a first generic field in the packet may be compared with a data parameter (data) of the match field of the first generic flow entry. If the two are the same, the matching succeeds, and if the two are different, the matching fails.

64. The switching device performs processing according to an action in an instruction set of a successfully matched generic flow entry, and now the optimized processing process of generic matching has ended.

If there is no generic flow entry that matches the packet, step 65 may be executed.

65. The switching device encapsulates the packet into a flow table request (packet_in) packet and sends the packet_in packet to the control device, where step 65 is not a required step in the optimized processing process of generic matching.

In addition, for a procedure in which the switching device acquires the generic flow entry, reference may be made to FIG. 4, and details are not described herein again.

In this embodiment, a prefix configuration table is created in a switching device, and after receiving a packet, the switching device first extracts a to-be-matched bit field according to the prefix configuration table, which can implement preprocessing on the packet, avoid extracting the to-be-matched bit field each time a generic flow entry is being traversed, and can improve efficiency of processing the generic flow entry.

Figure 7:
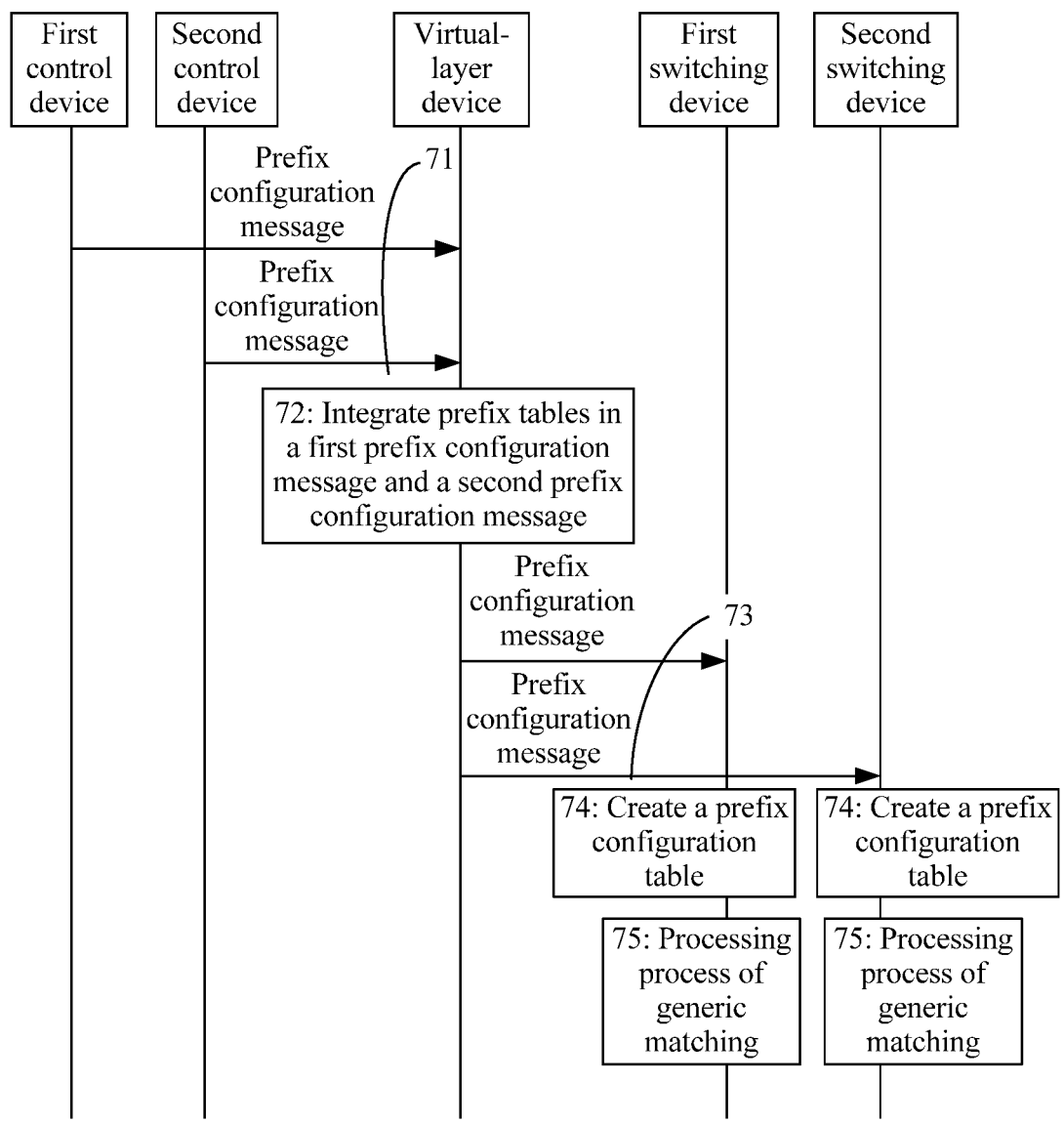
FIG. 7 is a schematic flowchart of another packet processing method according to an embodiment.
Figure 8:
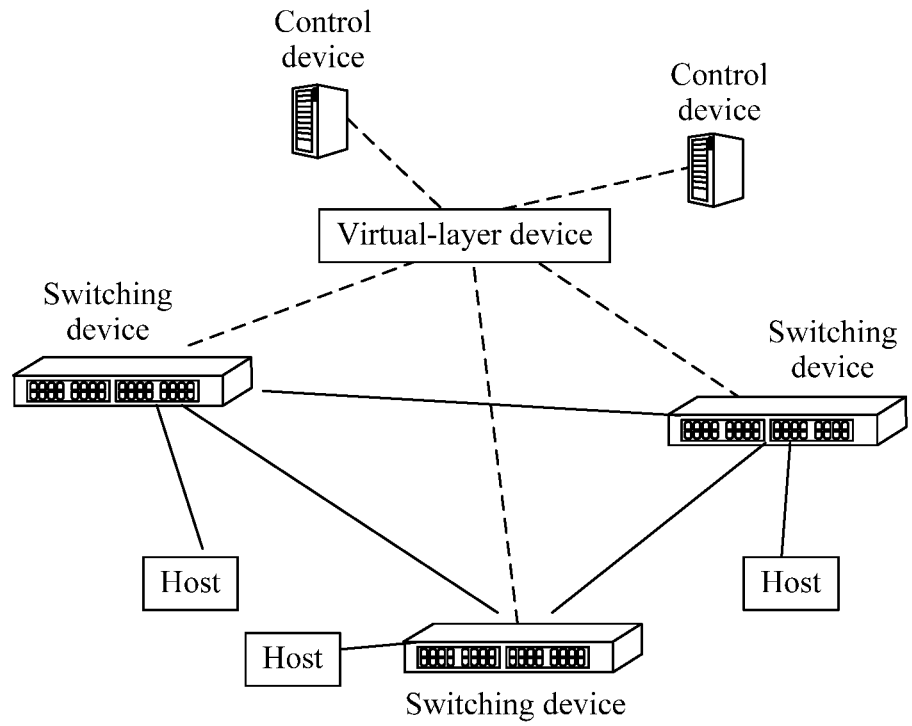
FIG. 8 is a schematic structural diagram of a system corresponding to FIG. 7.

FIG. 7 is a schematic flowchart of another packet processing method according to an embodiment, and FIG. 8 is a schematic structural diagram of a system corresponding to FIG. 7. In this embodiment, an OpenFlow network further includes a virtual-layer device, where the virtual-layer device may fragment resources of a forwarding plane, so that networks that have different forwarding logic and are isolated from each other can share a same group of physical forwarding plane devices. The virtual-layer device is, for example, a hypervisor.

Referring to FIG. 7, this embodiment includes the following steps:

71. A first control device and a second control device separately send a prefix configuration message to the virtual-layer device.

For a specific procedure in which each control device generates and sends the prefix configuration message, reference may be made to the foregoing steps 34 and 35, and details are not described herein again.

In addition, it may be understood that a quantity of control devices in this embodiment is not limited to two and may also be at least three. When there are at least three control devices, a principle similar to that of this embodiment may also be used for execution.

72. The virtual-layer device integrates prefix tables in a first prefix configuration message and a second prefix configuration message.

A prefix modification message sent by each control device may include information about a switching device and a corresponding prefix table. For example, a first prefix modification message includes information about a first switching device, information about a second switching device, a prefix table of the first switching device, and a prefix table of the second switching device, or includes only information about a first switching device and a prefix table of the first switching device, or includes only information about a second switching device and a prefix table of the second switching device, which is similar for a second prefix modification message.

The virtual-layer device may combine, according to the information that is about the switching device and is included in the prefix modification messages, same prefixes in prefix tables corresponding to a same switching device. For example, the prefix table of the first switching device included in the first prefix modification message includes a first prefix (which is specifically offset 1 and size 1), and the prefix table of the first switching device included in the second prefix modification message also includes the first prefix (which is specifically offset 1 and size 1), and in this case, the virtual-layer device may combine the first prefixes, so that a quantity of first prefixes sent to the first switching device is only one, instead of two.

In addition, the foregoing integration may also be deleting a prefix that needs to be discarded. The prefix that needs to be discarded may be predefined in the virtual-layer device, and the virtual-layer device may discard, after receiving the prefix modification message, the prefix that needs to be discarded. For example, the virtual-layer device predefines that a prefix that needs to be modified is a second prefix, and if the received first prefix modification message and/or the received second prefix modification message include/includes the second prefix, the second prefix is discarded, that is, an integrated prefix table no longer includes the second prefix.

Moreover, the foregoing integration may also be fragmentation processing. A large forwarding network that includes multiple switches may be divided into multiple logical areas, and different logical areas may overlap, and control devices in the different logical areas may also be different. All the switches in the large forwarding network are connected to the virtual-layer device, and all the control devices in the different logical areas are also connected to the virtual-layer device. For switches in an overlapping area, control devices in the overlapping area are logically regarded as one switch and only one prefix table modification message is sent. When the prefix table modification message reaches the virtual-layer device, the virtual-layer device splits the prefix table modification message into multiple prefix table modification messages, and sends the prefix table modification messages to different switches in the overlapping area.

It may be understood that the foregoing integration is not limited to the foregoing combining, deleting, or fragmentation processing, and may also be other processing.

73. The virtual-layer device respectively sends the prefix configuration messages to a first switching device and a second switching device, where each of the prefix configuration messages carries an integrated prefix table.

74. After receiving prefix modification messages, the first switching device and the second switching device create respective prefix configuration tables according to the integrated prefix tables carried in the prefix modification messages.

75. The first switching device and the second switching device separately perform an optimized processing process of generic matching according to the respective prefix configuration tables, where for specific content of steps 73 to 75, reference may be made to content of the foregoing steps 36 and 37 and FIG. 6.

In this embodiment, a prefix configuration table is created in a switching device, and after receiving a packet, the switching device first extracts a to-be-matched bit field in the packet in advance according to a prefix in the prefix configuration table, and then performs matching between the to-be-matched field and data parameters of match fields of multiple generic flow entries corresponding to the prefix, which can implement pre-extraction of the to-be-matched bit field in the packet, avoid a need of extracting the to-be-matched bit field once when each generic flow entry is being traversed, and therefore, efficiency of processing the generic flow entry can be improved. In addition, in this embodiment, integration is performed by a virtual-layer device, which can reduce a quantity of repeated prefixes that are from different control devices or discard a prefix that needs to be deleted, and can further improve validity of the prefix in the created prefix configuration table in the switching device, and further improve searching efficiency.

The foregoing describes the optimized processing procedure of generic matching, and in some scenarios, the control device may configure a generic flow entry and an exact flow entry for the switching device, that is, the switching device not only needs to perform matching of the exact flow entry, but also needs to perform matching of the generic flow entry. In this case, the exact flow entry and the generic flow entry may be collectively referred to as a hybrid flow entry, and for matching of the hybrid flow entry, matching in which exact matching and generic matching are combined may be referred as hybrid matching. Matching of the hybrid flow entry may be performed in an integrated manner or a separated manner. In the integrated manner, matching of one type of flow entry is used as a complement to matching of another type of flow entry, and in the separated manner, two matching types are performed independently in matching. Similar to the foregoing embodiment, matching of the exact flow entry may be referred to as exact matching, and matching of the generic flow entry may be referred to as generic matching. In generic matching, an optimized process of processing the generic flow entry that is performed by using the concept of the present invention may be referred to as optimized generic matching, and otherwise, a common process of processing the generic flow entry that is performed without using the concept of the present invention may be referred to as common generic matching.

Optionally, the switching device further includes an exact flow entry corresponding to the generic flow entry that is corresponding to the prefix, and the method further includes:

performing matching, by the switching device, between the packet and the exact flow entry before the switching device extracts, according to the prefix, the bit field used for matching, to extract, according to the prefix after the matching succeeds, the bit field used for matching; or performing matching, by the switching device, between the packet and the exact flow entry after successfully matching the value of the bit field and the data parameter of the match field of the generic flow entry corresponding to the prefix.

During the foregoing exact matching and generic matching, all exact flow entries and all generic flow entries may be traversed, to respectively complete exact matching and generic matching, or a correspondence between each exact flow entry and each generic flow entry may be created in advance, and after one type of matching (exact matching or generic matching) succeeds, another flow entry (a generic flow entry or an exact flow entry) corresponding to a successfully matched flow entry (an exact flow entry or a generic flow entry) is determined, and the other type of matching (generic matching or exact matching) is performed according to the corresponding flow entry (the generic flow entry or the exact flow entry), and flow entries in the other type of matching do not need to be traversed again.

Specifically, the foregoing performing matching, by the switching device, between the packet and the exact flow entry before the switching device extracts, according to the prefix, the bit field used for matching, to extract, according to the prefix after the matching succeeds, the bit field used for matching may specifically include:

sequentially performing matching, by the switching device, between the packet and exact flow entries before the switching device extracts, according to the prefix, the bit field used for matching, to sequentially extract, according to prefixes after the matching succeeds, bit fields used for matching; or sequentially performing matching, by the switching device, between the packet and exact flow entries before the switching device extracts, according to the prefix, the bit field used for matching, to extract, according to a prefix included in a generic flow entry corresponding to a successfully matched exact flow entry after the matching succeeds, the bit field used for matching.

The foregoing performing matching, by the switching device, between the packet and the exact flow entry after successfully matching the value of the bit field and the data parameter of the match field of the generic flow entry corresponding to the prefix may specifically include:

sequentially performing matching, by the switching device, between the packet and exact flow entries after successfully matching the value of the bit field and the data parameter of the match field of the generic flow entry corresponding to the prefix; or performing matching, by the switching device after successfully matching the value of the bit field and the data parameter of the match field of the generic flow entry corresponding to the prefix, between the packet and an exact flow entry corresponding to the successfully matched generic flow entry.

For details, reference may be made to subsequent embodiments.

Figure 9:
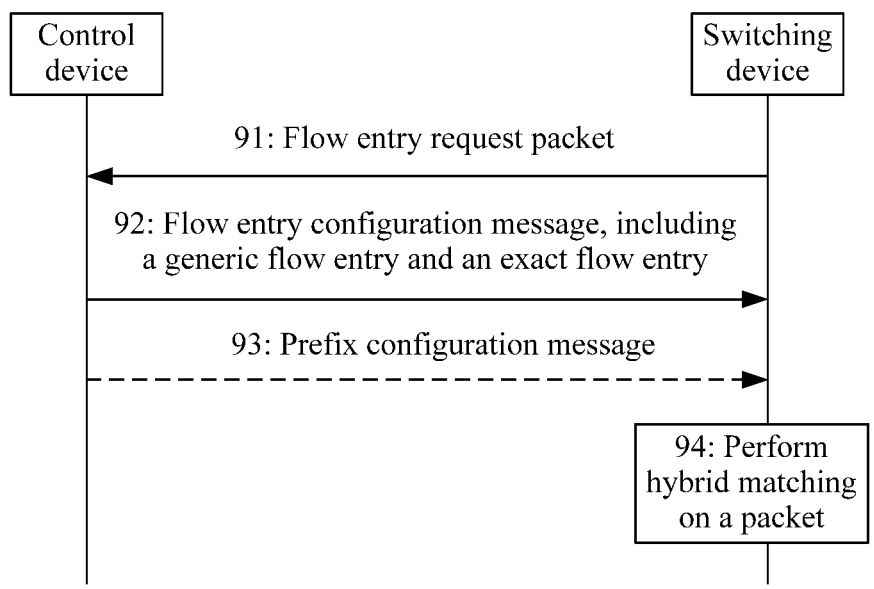
FIG. 9 is a schematic flowchart of another packet processing method according to an embodiment.

FIG. 9 is a schematic flowchart of another packet processing method according to an embodiment, and this embodiment is described by using hybrid matching in an integrated manner as an example. This embodiment includes the following steps:

91. A switching device sends a flow entry request packet to a control device.

The flow entry request packet may be a packet_in message.

After the switching device receives a packet, if there is no corresponding flow entry in the switching device, the switching device may encapsulate the packet into the flow entry request packet and send the flow entry request packet to the control device, to request a new flow entry.

92. The control device sends a flow entry configuration message to the switching device, where the flow entry configuration message includes an exact flow entry and a generic flow entry.

The flow entry configuration message may be used to add, modify, or delete a flow entry in the switching device.

Exemplarily, the switching device may be preconfigured with a prefix configuration table, and if the prefix configuration table is not configured, a prefix configuration message may also be used for configuration.

Optionally, the method may further include the following steps:

93. The control device sends a prefix modification message to the switching device, so that the switching device creates a prefix configuration table according to the prefix modification message.

For specific content of generating and sending the prefix modification message by the control device and specific content of creating the prefix configuration table by the switching device, reference may be made to corresponding steps in FIG. 3.

Now the switching device may perform hybrid matching processing.

94. The switching device performs hybrid matching on a packet.

Figure 10:
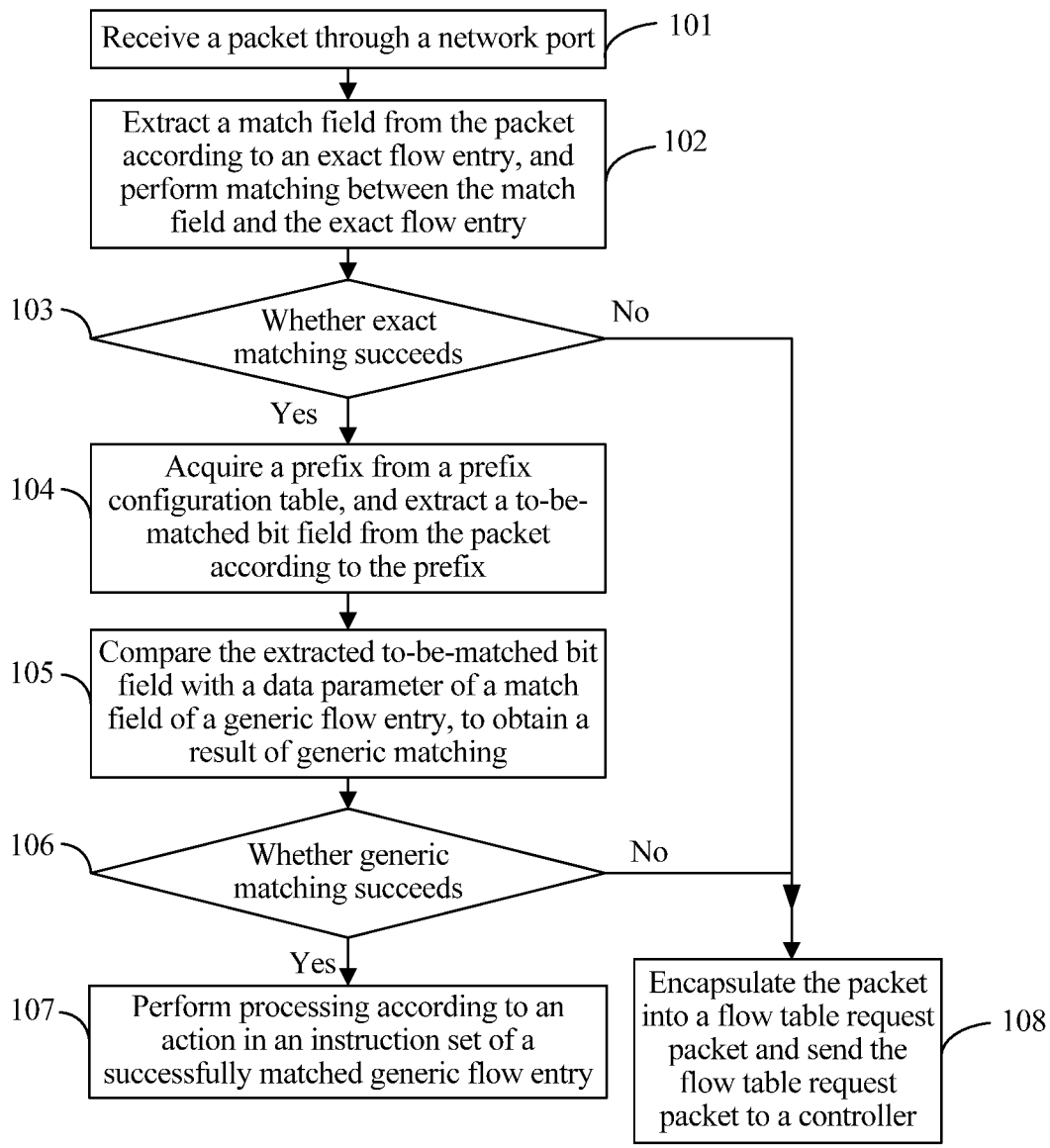
FIG. 10 is a schematic flowchart of packet processing according to a hybrid flow table according to an embodiment.

For a procedure in which the switching device performs hybrid matching processing on the packet in an integrated manner, reference may be made to FIG. 10, and the procedure includes the following steps:

101. The switching device receives the packet through a network port.

102. The switching device extracts a match field from the packet according to an exact flow entry, and performs matching between the match field and the exact flow entry, where a field predefined in the packet may be referred to as the match field, such as a destination IP and a source IP.

For example, match fields of a corresponding set quantity are extracted from the packet according to the set quantity of match fields specified in a protocol, where the match fields include multiple fields such as a source IP address and a destination IP address. Then, a value of the extracted match field is compared with a value of a corresponding field in the exact flow entry, and if the two are the same, the matching succeeds, and if the two are different, the matching fails. Certainly, the foregoing matching type is merely an example, and during specific exact matching, a mask may further be used to perform masking, or the like.

103. The switching device determines whether exact matching succeeds, if the exact matching succeeds, executes step 104, and if the exact matching fails, executes step 108.

104. The switching device acquires a prefix from the prefix configuration table, and extracts a to-be-matched bit field from the packet according to the prefix; exemplarily, there may be one or more acquired prefixes herein.

105. The switching device compares the extracted to-be-matched bit field with a data parameter of a match field of a generic flow entry corresponding to the prefix, to obtain a result of generic matching.

106. The switching device determines whether generic matching succeeds, if the generic matching succeeds, executes step 107, and if the generic matching fails, executes step 108.

107. The switching device performs processing according to an action in an instruction set of a successfully matched generic flow entry.

Now it may be regarded that hybrid matching processing in the integrated manner is completed.

If there is no flow entry that matches the received packet in the switching device, the switching device may further request a flow entry that matches the packet from the control device, as shown in step 108.

108. The switching device encapsulates the packet into a flow table request packet (for example, packet_in) and sends the flow table request packet to the control device, to request the control device to deliver a flow entry that matches the packet.

In this embodiment, when hybrid matching is performed in an integrated manner, it may be first determined whether exact matching succeeds, and when the exact matching succeeds, it needs to be further determined whether generic matching succeeds, and only when both the exact matching and the generic matching succeed, a corresponding action is performed.

It may be understood that, in FIG. 10, exact matching is first performed and then generic matching is performed, or generic matching may be first performed, and when the generic matching succeeds, exact matching and processing are then performed.

In addition, in the embodiment shown in FIG. 10, during generic matching, the to-be-matched bit field is first extracted by using the prefix, or after the exact matching succeeds, a common procedure of generic matching is used, and in this case, the prefix configuration table does not need to be created.

Figure 11:
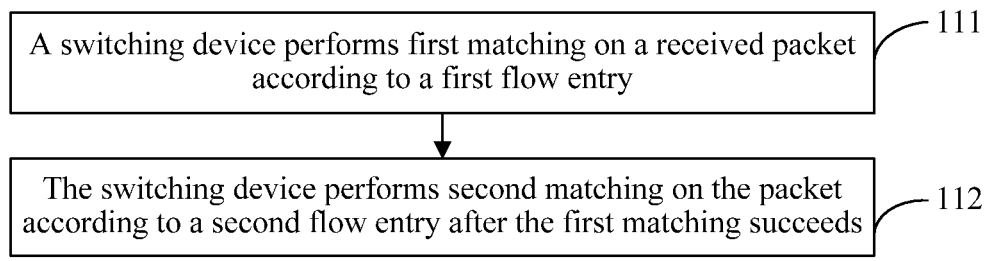
FIG. 11 is another schematic flowchart of packet processing according to a hybrid flow table according to an embodiment.

Referring to FIG. 11, in a scenario of a hybrid flow table, an embodiment includes the following steps:

111. A switching device performs first matching on a received packet according to a first flow entry.

112. The switching device performs second matching on the packet according to a second flow entry after the first matching succeeds.

Exemplarily, the first flow entry is an exact flow entry, the first matching is exact matching, the second flow entry is a generic flow entry, and the second matching is generic matching; or the first flow entry is a generic flow entry, the first matching is generic matching, the second flow entry is an exact flow entry, and the second matching is exact matching.

Optionally, when the first flow entry is a generic flow entry, during generic matching, a to-be-matched bit field may also be first extracted from the packet according to a prefix in a prefix configuration table, and then matching is performed between the to-be-matched bit field and the generic flow entry. For specific content of creating the prefix configuration table, extracting a generic field, and performing matching, reference may be made to the foregoing embodiment.

In this embodiment, another type of matching is performed after one type of matching succeeds, and packet matching processing may be completed in the scenario of a hybrid flow table, which improves processing efficiency.

Figure 12:
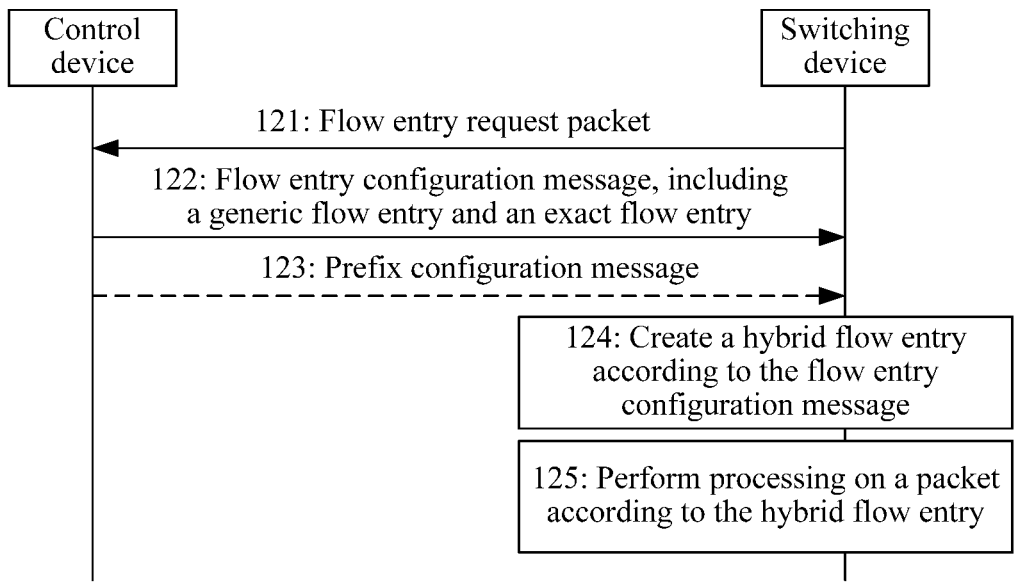
FIG. 12 is a schematic flowchart of another packet processing method according to an embodiment.

FIG. 12 is a schematic flowchart of another packet processing method according to an embodiment, and a hybrid flow table in a separated manner is used as an example in this embodiment. This embodiment includes the following steps:

121. A switching device sends a flow entry request packet (for example, packet_in) to a control device.

After the switching device receives a first packet, if there is no corresponding flow entry in the switching device, the switching device may encapsulate the first packet into the flow entry request packet and send the flow entry request packet to the control device, to request a flow entry corresponding to the first packet.

122. The control device sends a flow entry configuration message to the switching device, where the flow entry configuration message includes an exact flow entry, a generic flow entry, and a matching type.

Exemplarily, the flow entry configuration message may be used to add, modify, or delete a flow entry in the switching device.

The matching type (match type) includes: only exact matching, only generic matching, hybrid matching in an integrated manner, and hybrid matching in a separated manner. Different values may be used to indicate matching types, so that the switching device learns the matching types according to the values. For example, 00 is used to indicate only exact matching (only exact match), 01 is used to indicate only generic matching (only generic match), 10 is used to indicate hybrid matching (multiple match) in an integrated manner, and 11 is used to indicate hybrid matching in a separated manner.

Now the switching device has acquired the exact flow entry and the generic flow entry, and the switching device may further learn which type of matching needs to be performed.

Optionally, the method may further include the following steps:

123. The control device sends a prefix configuration message to the switching device, so that the switching device creates a prefix configuration table according to a prefix in the prefix configuration message.

For specific content of generating and sending the prefix configuration message by the control device and specific content of creating the prefix configuration table by the switching device, reference may be made to corresponding steps in FIG. 3.

124. The switching device creates a hybrid flow entry according to the flow entry configuration message, where the hybrid flow entry includes a generic flow entry, an exact flow entry, and a mapping table, and the mapping table is used to indicate a correspondence between the exact flow entry and the generic flow entry.

Figure 13:
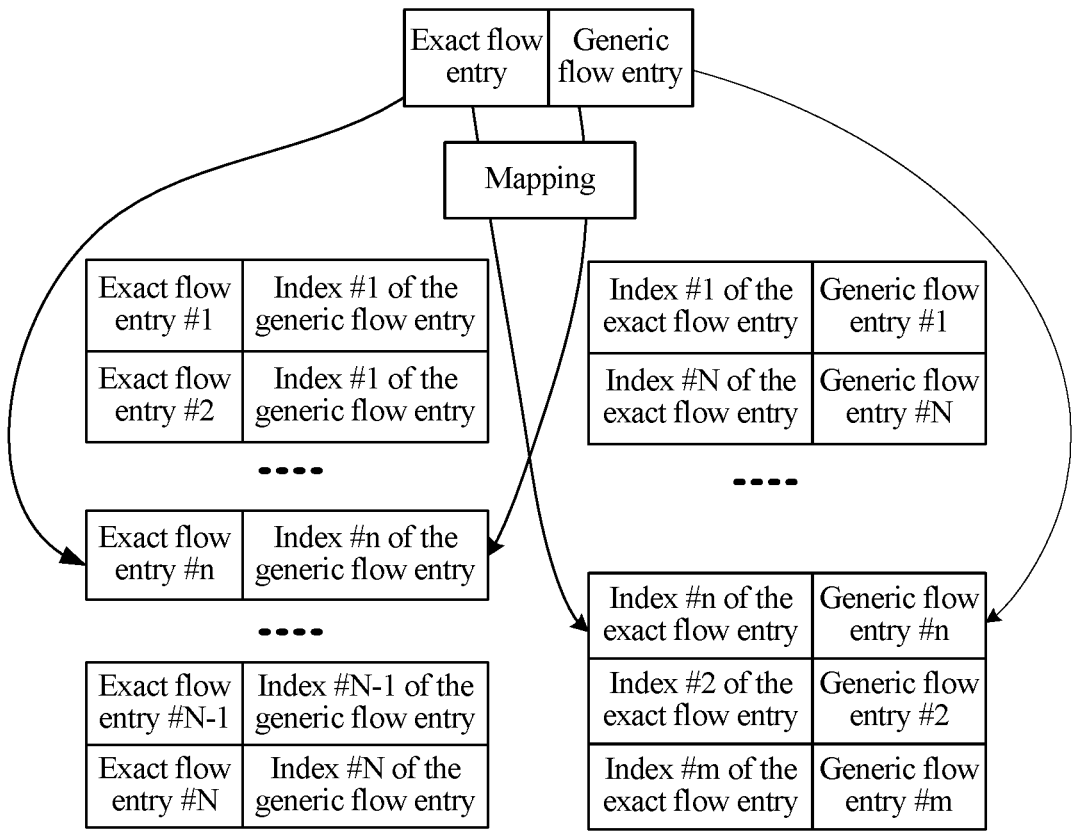
FIG. 13 is a schematic diagram of a mapping relationship between a generic flow entry and an exact flow entry according to an embodiment.

Referring to FIG. 13, the switching device inserts an index of a corresponding exact flow entry when creating each generic flow entry, for example, an index of an exact flow entry corresponding to created generic flow entry #1 is index #1; the switching device inserts an index of a corresponding generic flow entry when creating each exact flow entry, for example, an index of a generic flow entry corresponding to created exact flow entry #1 is index #1.

125. The switching device processes a packet according to the hybrid flow entry, that is, performs hybrid matching processing on the packet.

Figure 14:
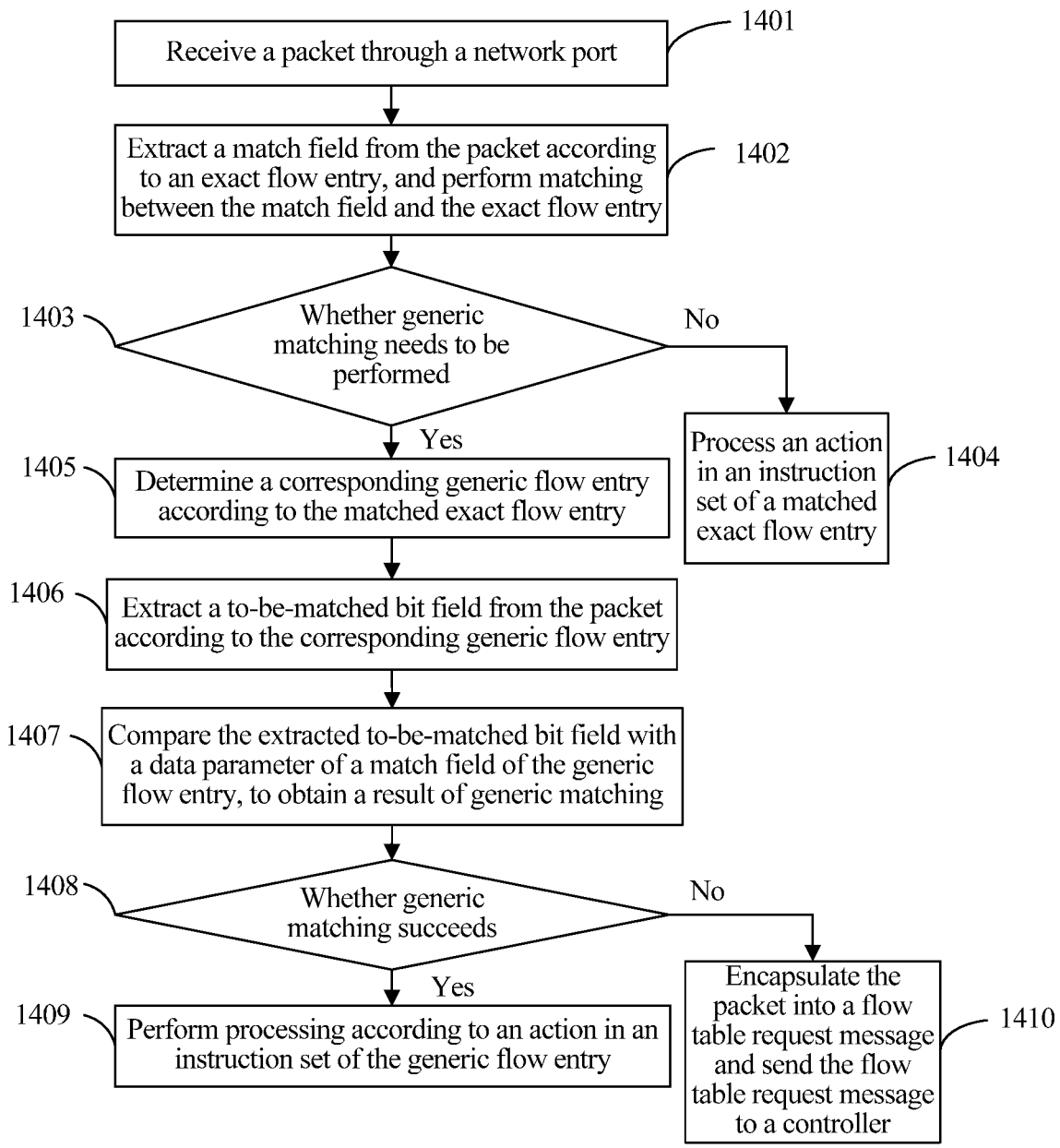
FIG. 14 is another schematic flowchart of packet processing according to a hybrid flow table according to an embodiment.

For a procedure in which the switching device processes the packet according to the hybrid flow entry, reference may be made to FIG. 14, and the procedure includes the following steps:

1401. The switching device receives the packet through a network port.

1402. The switching device extracts a match field from the packet according to the exact flow entry, and performs matching between the match field and the exact flow entry, where for description of the match field, reference may be made to the embodiment shown in FIG. 10, and details are not described herein.

For example, the exact flow entry indicates that a to-be-matched field is a source IP address, and then a source IP address may be directly extracted from the packet, and a value of the source IP address of the packet is compared with a value of a source IP address in the exact flow entry. If the two are the same, the matching succeeds, and if the two are different, the matching fails.

1403. The switching device determines whether generic matching needs to be performed, if the generic matching needs to be performed, executes step 1405, and if the generic matching does not need to be performed, executes step 1404.

The switching device may perform determining according to a matching type. For description of the matching type, reference may be made to the embodiment shown in FIG. 12, and details are not described herein.

1404. The switching device executes an action in an instruction set of a matched exact flow entry.

Exemplarily, there may be one or more exact flow entries that match the packet. When there are multiple matched exact flow entries, the switching device may sequentially execute actions in instruction sets of the matched exact flow entries, or may execute actions in instruction sets of the matched exact flow entries according to priorities of the actions, or may execute only an action with a highest priority in instruction sets of the matched exact flow entries. Description about executing, by the switching device, the action in the instruction set of the matched exact flow entry in another embodiment is similar to this embodiment.

Exemplarily, if exact matching fails, a flow entry request (packet_in) message may be sent to the control device.

1405. The switching device determines a corresponding generic flow entry according to the matched exact flow entry.

For example, if an exact flow entry that is used to perform extracting and matching on the packet is exact flow entry #1, and if an index that is of a generic flow entry that is inserted into exact flow entry # is index #1 according to a mapping relationship between the exact flow entry and the generic flow entry, the determined generic flow entry is a generic flow entry whose index is #1. Herein, there may be one or more determined generic flow entries.

1406. The switching device extracts a to-be-matched bit field from the packet according to the corresponding generic flow entry.

For example, a match field of the generic flow entry whose index is #1 may include a prefix (offset, size, and mask), and extracts the corresponding to-be-matched bit field from the packet according to the offset, the size, and the mask.

Exemplarily, if there are multiple generic flow entries whose index is #1, for common generic matching, the to-be-matched bit field needs to be extracted for each corresponding generic flow entry. If prefixes in match fields of some generic flow entries of the multiple generic flow entries whose index is #1 are the same, optimized generic matching may also be used, and the to-be-matched bit field is extracted only once for multiple generic flow entries with a same prefix.

1407. The switching device compares the extracted to-be-matched bit field with a data parameter of a match field of the generic flow entry, to obtain a result of generic matching.

For example, the to-be-matched bit field extracted according to the generic flow entry whose index is #1 is a first bit field, and then the first bit field is compared with a data parameter (data) of the match field of the generic flow entry whose index is #1. If values of the two are the same, the generic matching succeeds, and if the values of the two are different, the generic matching fails.

1408. The switching device determines whether the generic matching succeeds, if the generic matching succeeds, executes step 1409, and if the generic matching fails, executes step 1410.

Exemplarily, when there are multiple generic flow entries, the generic matching may be considered to be successful as along as one of the generic flow entries can be matched.

1409. The switching device performs processing according to an action in an instruction set of the generic flow entry.

Exemplarily, as described above, there may be one or more generic flow entries that match the packet. When there are multiple matched generic flow entries, the switching device may sequentially execute actions in instruction sets of the matched generic flow entries, or may execute actions in instruction sets of the matched generic flow entries according to priorities of the actions, or may execute only an action with a highest priority in instruction sets of the matched generic flow entries. Description about executing, by the switching device, the action in the instruction set of the matched generic flow entry in another embodiment is similar to this embodiment.

If there is no generic flow entry that matches the packet received by the switching device, the switching device may end the procedure, or may request a flow entry that matches the packet from the control device. For example, reference may be made to step 1410.

1410. The switching device encapsulates the packet into a flow table request (packet_in) message and sends the flow table request message to the control device.

It may be understood that in FIG. 14, exact matching is first performed, then it is determined whether to perform generic matching, and processing is performed according to a generic match entry corresponding to a matched exact match entry when generic matching needs to be performed, or generic matching is first determined, then it is determined whether to perform exact matching, and processing is performed according to an exact match entry corresponding to a matched generic match entry when exact matching needs to be performed.

In addition, when generic matching is first being performed, a generic field may be first extracted from the packet according to the prefix configuration table, and then matching may be performed between the generic field and each generic flow entry in a generic flow table. Details are not described herein, and reference is made to the foregoing related embodiment.

Figure 15:
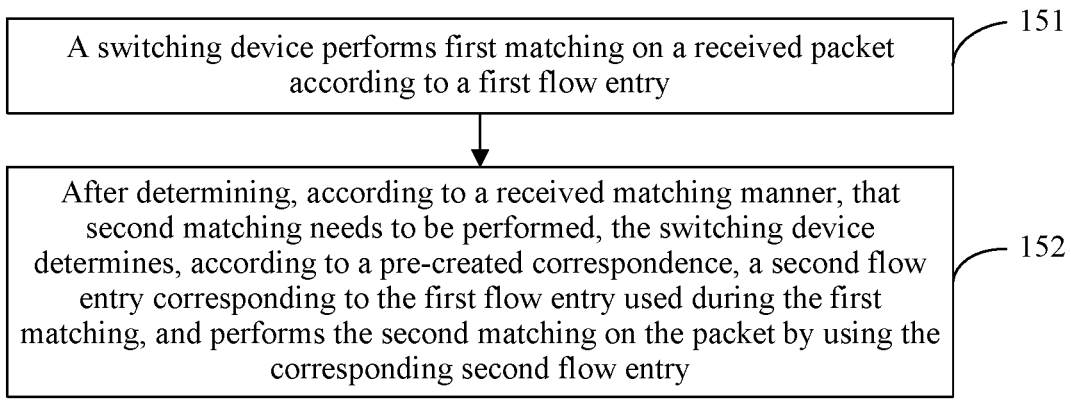
FIG. 15 is another schematic flowchart of packet processing according to a hybrid flow table according to an embodiment.

Referring to FIG. 15, in a scenario of a hybrid flow table, an embodiment includes the following steps:

151. A switching device performs first matching on a received packet according to a first flow entry.

152. After determining, according to a received matching type, that second matching needs to be performed, the switching device determines, according to a pre-created correspondence, a second flow entry corresponding to the first flow entry used during the first matching, and performs the second matching on the packet by using the corresponding second flow entry.

The first flow entry is an exact flow entry, the first matching is exact matching, the second flow entry is a generic flow entry, and the second matching is generic matching; or the first flow entry is a generic flow entry, the first match entry is a generic match, the second flow entry is an exact flow entry, and the second matching is exact matching.

The foregoing pre-created correspondence is a mapping relationship, shown in FIG. 13, between a generic flow entry and an exact flow entry, and for a specific creating procedure, reference may be made to the foregoing embodiment.

Optionally, when the first flow entry is a generic flow entry, during generic matching, a to-be-matched bit field may also be first extracted from the packet according to a prefix in a prefix configuration table, and then matching is performed between the generic field and the generic flow entry. For specific content of specifically creating the prefix configuration table, extracting the to-be-matched bit field, and performing matching, reference may be made to the foregoing related embodiment.

In this embodiment, a mapping relationship between an exact flow entry and a generic flow entry is created when flow tables are combined, which can ensure uniqueness between a generic flow table and an exact flow table, and improve an application value of generic flow processing.

Figure 16:
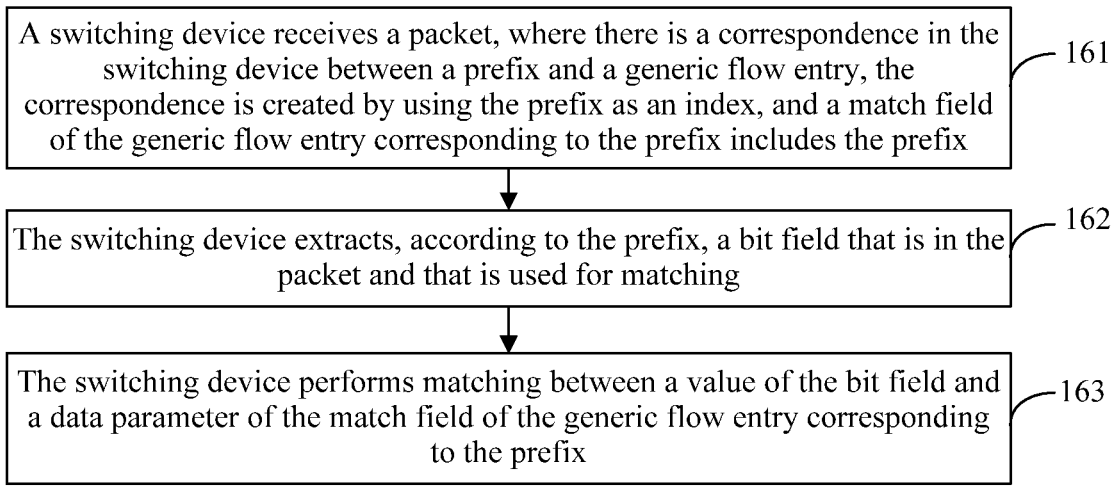
FIG. 16 is a schematic flowchart of another packet processing method according to an embodiment.

FIG. 16 is a schematic flowchart of another packet processing method according to an embodiment, and the method includes the following steps:

161. A switching device receives a packet, where there is a correspondence in the switching device between a prefix and a generic flow entry, the correspondence is created by using the prefix as an index, and a match field of the generic flow entry corresponding to the prefix includes the prefix.

162. The switching device extracts, according to the prefix, a bit field that is in the packet and that is used for matching.

163. The switching device performs matching between a value of the bit field and a data parameter of the match field of the generic flow entry corresponding to the prefix.

Optionally, there is further an exact flow entry corresponding to the generic flow entry in the switching device, and the method further includes:

before the switching device extracts, according to the prefix, the bit field that is in the packet and that is used for matching, performing matching, by the switching device, between the packet and the exact flow entry, to extract, according to the prefix after the matching succeeds, the bit field that is in the packet and that is used for matching; or performing matching, by the switching device, between the packet and the exact flow entry after successfully matching the value of the bit field and the data parameter of the match field of the generic flow entry corresponding to the prefix.

Figure 17:
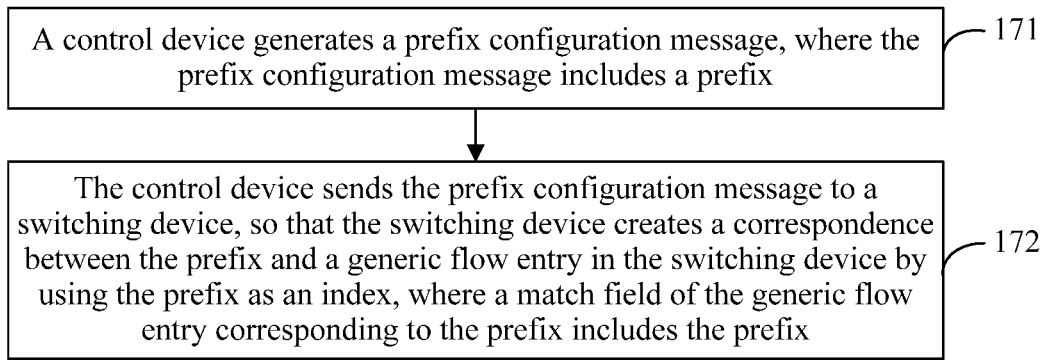
FIG. 17 is a schematic flowchart of another packet processing method according to an embodiment.

FIG. 17 is a schematic flowchart of another packet processing method according to an embodiment, and the method includes the following steps:

171. A control device generates a prefix configuration message, where the prefix configuration message includes a prefix.

172. The control device sends the prefix configuration message to a switching device, so that the switching device creates a correspondence between the prefix and a generic flow entry in the switching device by using the prefix as an index, where a match field of the generic flow entry corresponding to the prefix includes the prefix.

The prefix included in the prefix configuration message and the prefix included in the match field of the generic flow entry may differ in data structure, but carry same content.

Optionally, the method further includes:
sending, by the control device, a feature request message to the switching device, and receiving a feature reply message sent by the switching device, where the feature reply message carries a match type supported by the switching device; and determining, by the control device according to the match type supported by the switching device, that the switching device supports generic matching.

Optionally, that the control device sends the prefix configuration message to a switching device includes:
sending, by the control device, multiple prefix configuration messages to a virtual-layer device, so that the virtual-layer device integrates the multiple prefix configuration messages, and sends a prefix configuration message obtained after integration to the switching device.

Optionally, the method further includes:
when the generic flow entry is delivered to the switching device, collecting, by the control device, statistics on the prefix corresponding to the delivered generic flow entry; and determining, by the control device according to a statistical result, the prefix included in the prefix configuration message.

In this embodiment, a control device sends a prefix to a switching device, so that the switching device can first extract a generic field from a packet according to the prefix after receiving the packet, which can implement preprocessing on the packet, avoid traversing each generic flow entry, and improve searching efficiency.

Figure 18:
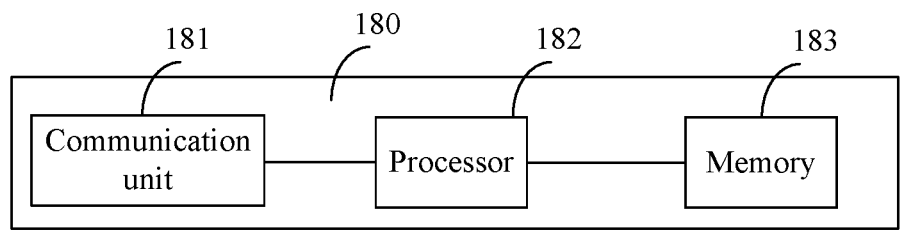
FIG. 18 is a schematic structural diagram of a switching device according to an embodiment.

FIG. 18 is a schematic structural diagram of a switching device according to an embodiment, and the device 180 includes a communication unit 181, a processor 182, and a memory 183.

The memory 183 is configured to store a correspondence that is between a prefix and a generic flow entry and is created by using the prefix as an index, where a match field of the generic flow entry corresponding to the prefix includes the prefix.

The communication unit 181 is configured to receive a packet.

The processor 182 is configured to: acquire, according to the prefix, a bit field that is in the packet and that is used for matching, and perform matching between a value of the bit field and a data parameter of the match field of the generic flow entry corresponding to the prefix.

Optionally, the memory 183 is further configured to store an exact flow entry corresponding to the generic flow entry; and that the processor 182 is configured to perform matching between a value of the bit field and a data parameter of the match field of the generic flow entry corresponding to the prefix includes: the processor 182 is configured to perform matching between the packet and the exact packet, and after the matching succeeds, perform matching between the value of the bit field and the data parameter of the match field of the generic flow entry corresponding to the prefix.

Optionally, the memory 183 is further configured to store an exact flow entry corresponding to the generic flow entry; and the processor is further configured to perform matching between the packet and the exact flow entry when matching performed between the value of the bit field and the data parameter of the match field of the generic flow entry corresponding to the prefix succeeds.

Optionally, the processor 182 is further configured to create the correspondence between the prefix and the generic flow entry by using the prefix as an index.

Optionally, the communication unit 181 is further configured to receive a prefix configuration message sent by a control device, where the prefix configuration message includes the prefix.

The communication unit 181 is further configured to: receive a feature request message sent by the control device, and send a feature reply message to the control device, where the feature reply message indicates that the switching device supports generic matching, so that the control device sends the prefix configuration message according to the feature reply message.

In another optional implementation manner, the switching device may include:
- a storage unit, configured to store a correspondence that is between a prefix and a generic flow entry and is created by using the prefix as an index, where a match field of the generic flow entry corresponding to the prefix includes the prefix;
- a receiving unit, configured to receive a packet;
- an acquiring unit, configured to acquire, according to the prefix, a bit field that is in the packet and that is used for matching; and
- a first matching unit, configured to perform matching between a value of the bit field and a data parameter of the match field of the generic flow entry corresponding to the prefix.

Optionally, the storage unit is further configured to store an exact flow entry corresponding to the generic flow entry; and the switching device further includes a second matching unit, where the second matching unit is configured to perform matching between the packet and the exact flow entry, and the first matching unit is specifically configured to: when matching performed by the second matching unit succeeds, perform matching between the value of the bit field and the data parameter of the match field of the generic flow entry corresponding to the prefix.

Optionally, the storage unit is further configured to store an exact flow entry corresponding to the generic flow entry; and the switching device further includes a third matching unit, where the third matching unit is configured to perform matching between the packet and the exact flow entry when matching performed by the first matching unit succeeds.

Optionally, the switching device further includes a creating unit, where the creating unit is configured to create the correspondence between the prefix and the generic flow entry by using the prefix as an index.

Optionally, the receiving unit is further configured to receive a prefix configuration message sent by a control device, where the prefix configuration message includes the prefix.

Optionally, the receiving unit is further configured to receive a feature request message sent by the control device; and the switching device further includes a sending unit, configured to send a feature reply message to the control device, where the feature reply message indicates that the switching device supports generic matching, so that the control device sends the prefix configuration message according to the feature reply message.

In this embodiment, a switching device receives a prefix sent by a control device, so that a correspondence between the prefix and a generic flow entry can be created in the switching device; after receiving a packet, the switching device first extracts a to-be-matched bit field from the packet according to the prefix, and then sequentially performs matching between the to-be-matched bit field and data parameters of match fields of generic flow entries corresponding to the prefix, which avoids a need of extracting the to-be-matched bit field once for each generic flow entry, and can improve efficiency of processing the generic flow entry.

Figure 19:
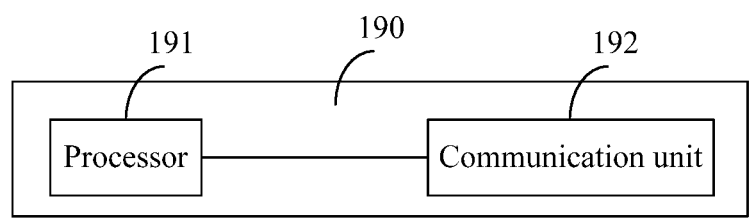
FIG. 19 is a schematic structural diagram of a control device according to an embodiment.

FIG. 19 is a schematic structural diagram of a control device according to an embodiment, and the device 190 includes a processor 191 and a communication unit 192.

The processor 191 is configured to generate a prefix configuration message, where the prefix configuration message includes a prefix.

The communication unit 192 is configured to send the prefix configuration message to a switching device, so that the switching device creates a correspondence between the prefix and a generic flow entry in the switching device by using the prefix as an index, where a match field of the generic flow entry corresponding to the prefix includes the prefix.

Optionally, the processor 191 is further configured to: when the generic flow entry is delivered to the switching device, collect statistics on the prefix corresponding to the delivered generic flow entry; and determine, according to a statistical result, the prefix included in the prefix configuration message.

Optionally, the communication unit 192 is specifically configured to send multiple prefix configuration messages to a virtual-layer device, so that the virtual-layer device integrates the multiple prefix configuration messages, and sends a prefix configuration message obtained after integration to the switching device.

Optionally, the communication unit 192 is further configured to: send a feature request message to the switching device, and receive a feature reply message sent by the switching device, where the feature reply message carries a match type supported by the switching device; and the processor 191 is further configured to determine, according to the match type supported by the switching device, that the switching device supports generic matching.

In an optional implementation manner, the control device may include:
- a generating unit, configured to generate a prefix configuration message, where the prefix configuration message includes a prefix; and
- a sending unit, configured to send the prefix configuration message to a switching device, so that the switching device creates a correspondence between the prefix and a generic flow entry in the switching device by using the prefix as an index, where a match field of the generic flow entry corresponding to the prefix includes the prefix.

Optionally, the control device further includes a statistics collecting unit, configured to: when the generic flow entry is delivered to the switching device, collect statistics on the prefix corresponding to the delivered generic flow entry; and a determining unit, configured to determine, according to a statistical result, the prefix included in the prefix configuration message.

Optionally, the sending unit is specifically configured to send multiple prefix configuration messages to a virtual-layer device, so that the virtual-layer device integrates the multiple prefix configuration messages, and sends a prefix configuration message obtained after integration to the switching device.

Optionally, the sending unit is further configured to send a feature request message to the switching device; and the control device further includes a receiving unit and a capability determining unit, where the receiving unit is configured to receive a feature reply message sent by the switching device, where the feature reply message carries a match type supported by the switching device; and the capability determining unit is configured to determine, according to the match type supported by the switching device, that the switching device supports generic matching.

In this embodiment, a control device sends a prefix to a switching device, so that the switching device can create a correspondence between the prefix and a generic flow entry; after receiving a packet, the switching device first extracts a to-be-matched bit field from the packet according to the prefix, and then sequentially performs matching between the to-be-matched bit field and data parameters of match fields of generic flow entries corresponding to the prefix, which avoids a need of extracting the to-be-matched bit field once for each generic flow entry, and can improve efficiency of processing the generic flow entry.

Figure 20:
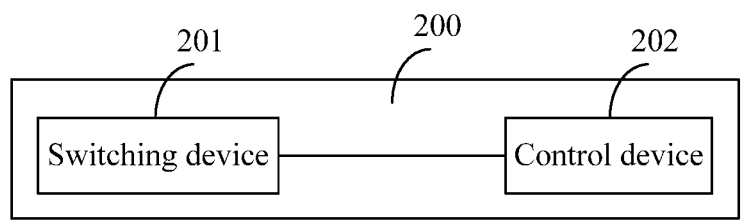
FIG. 20 is a schematic structural diagram of a packet processing system according to an embodiment.
Figure 21:
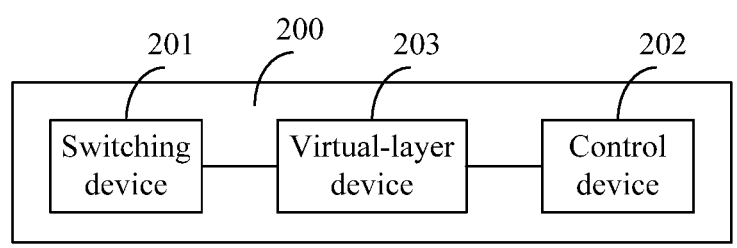
FIG. 21 is a schematic structural diagram of another packet processing system according to an embodiment.

FIG. 20 is a schematic structural diagram of a packet processing system according to an embodiment, and the system 200 includes a switching device 201 and a control device 202. The switching device 201 may specifically directly communicate with the control device, as described in FIG. 18, and the control device 202 may specifically directly communicate with the switching device, as described in FIG. 19. Alternatively, referring to FIG. 21, the system may further include a virtual-layer device 203, and in this case, the switching device 201 may specifically communicate with the control device by using the virtual-layer device, as described in FIG. 18, and the control device 202 may specifically directly communicate with the switching device by using the virtual-layer device, as described in FIG. 19. The virtual-layer device 203 is configured to receive multiple prefix configuration messages sent by the control device 202, integrate the multiple prefix configuration messages, and send a prefix configuration message obtained after integration to the switching device 201.

In this embodiment, a control device sends a prefix to a switching device, so that the switching device can create a correspondence between the prefix and a generic flow entry; after receiving a packet, the switching device first extracts a to-be-matched bit field from the packet according to the prefix, and then sequentially performs matching between the to-be-matched bit field and data parameters of match fields of generic flow entries corresponding to the prefix, which avoids a need of extracting the to-be-matched bit field once for each generic flow entry, and can improve efficiency of processing the generic flow entry.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from scope of the technical solutions of the embodiments of the present application.

What is claimed is:

1. A packet processing method performed by a switching device, comprising:
 receiving a feature request message from a control device;
 sending a feature reply message to the control device, wherein the feature reply message indicates that a generic matching is supported;
 receiving a packet;
 identifying a bit field that is in the packet according to a prefix; and
 determining that a value of the bit field matches a data parameter of a match field of a generic flow entry indexed by the prefix, wherein the generic flow entry is stored on the switching device and the match field comprises the prefix.

2. The method according to claim 1, further comprising:
 determining that the packet matches an exact flow entry corresponding to the generic flow entry.

3. The method according to claim 1, further comprising:
 creating an index of the generic flow entry, wherein the index is the prefix.

4. The method according to claim 3, further comprising:
 receiving a prefix configuration message from the control device, wherein the prefix configuration message comprises the prefix.

5. A packet processing method, performed by a control device, comprising:
- sending a feature request message to a switching device, and receiving a feature reply message from the switching device, wherein the feature reply message indicates that a generic matching is supported;
- generating a prefix configuration message, wherein the prefix configuration message comprises a prefix, wherein the prefix indexes a generic flow entry stored on the switching device; and
- sending the prefix configuration message to the switching device through a virtual-layer device integrating the prefix configuration message and another prefix configuration message.

6. The method according to claim 5, further comprising:
- collecting statistics on the prefix indexing the generic flow entry; and
- the generating the prefix configuration message comprises:
- generating the prefix configuration message according to the statistical result of the prefix.

7. A switching apparatus, comprising:
- a storage medium; and
- a processor coupled to the storage medium and configured to:
- receive a packet;
- identify a bit field that is in the packet according to a prefix; and
- determine that a value of the bit field matches a data parameter of a match field of a generic flow entry indexed by the prefix, wherein the generic flow entry is stored on the switching device and the match field comprises the prefix;
- wherein the processor is further configured to:
- receive a feature request message from a control device; and
- send a feature reply message to the control device, wherein the feature reply message indicates that a generic matching is supported.

8. The switching apparatus according to claim 7, wherein the processor is further configured to:
- determine that the packet matches an exact flow entry corresponding to the generic flow entry.

9. The switching apparatus according to claim 7, wherein the processor is further configured to:
- create an index of the generic flow entry, wherein the index is the prefix.

10. The switching apparatus according to claim 7, wherein the processor is further configured to:
- receive a prefix configuration message from the control device, wherein the prefix configuration message comprises the prefix.

11. A control apparatus, comprising:
- a storage medium; and
- a processor coupled to the storage medium and configured to:
- send a feature request message to a switching device, and receive a feature reply message from the switching device, wherein the feature reply message indicates that a generic matching is supported;
- generate a prefix configuration message, wherein the prefix configuration message comprises a prefix, and wherein the prefix indexes a generic flow entry stored on the switching device; and
- send the prefix configuration message to the switching device through a virtual-layer device integrating the prefix configuration message and another prefix configuration message.

12. The control apparatus according to claim 11, wherein the processor is further configured to:
- collect statistics on the prefix indexing the generic flow entry; and
- generate the prefix configuration message according to the statistical result of the prefix.

13. A system, comprising:
- a switching apparatus, configured to:
- receive a feature request message and send a feature reply message, wherein the feature reply message indicates that a generic matching is supported;
- receive a packet;
- identify a bit field that is in the packet according to a prefix; and
- determine that a value of the bit field matches a data parameter of a match field of a generic flow entry indexed by the prefix, wherein the generic flow entry is stored on the switching apparatus and the match field comprises the prefix;
- a control apparatus, configured to:
- send the feature request message and receive the feature reply message;
- generate a prefix configuration message, wherein the prefix configuration message comprises a prefix, and wherein the prefix indexes a generic flow entry stored on the switching apparatus; and
- send the prefix configuration message to the switching apparatus.

14. The system according to claim 13, wherein the control apparatus is configured to:
- send the prefix configuration message to the switching apparatus through a virtual-layer device integrating the prefix configuration message and another prefix configuration message.

15. The system according to claim 14, wherein the switching apparatus is further configured to:
- determine that the packet matches an exact flow entry corresponding to the generic flow entry.

16. The system according to claim 15, wherein the switching apparatus is further configured to:
- create an index of the generic flow entry, wherein the index is the prefix.

17. The system according to claim 16, wherein the control apparatus is further configured to:
- collect statistics on the prefix indexing the generic flow entry; and
- generate the prefix configuration message according to the statistical result of the prefix.

* * * * *